US012691464B2

(12) United States Patent
Silver et al.

(10) Patent No.: US 12,691,464 B2
(45) Date of Patent: Jul. 28, 2026

(54) SPRAYING DEVICE AND METHODS

(71) Applicant: INSTAPURIFY TECHNOLOGY LLC, Indian Creek Village, FL (US)

(72) Inventors: Martin Silver, Indian Creek Village, FL (US); David Pierre Vieau, North Miami Beach, FL (US); Kurtis Thomas Lammer, Guelph (CA); Amro Moustafa, Hamilton (CA); Tristan Eric Zimmermann, Guelph (CA)

(73) Assignee: INSTAPURIFY TECHNOLOGY LLC, Indian Creek Village, FL (US)

( * ) Notice: Subject to any disclaimer, the term of this patent is extended or adjusted under 35 U.S.C. 154(b) by 0 days.

(21) Appl. No.: 19/368,245

(22) Filed: Oct. 24, 2025

(65) Prior Publication Data

US 2026/0175249 A1      Jun. 25, 2026

Related U.S. Application Data

(60) Provisional application No. 63/834,041, filed on Feb. 13, 2025, provisional application No. 63/833,602, filed on Dec. 19, 2024.

(51) Int. Cl.
B05B 15/62          (2018.01)
B05B 12/12          (2006.01)
(Continued)

(52) U.S. Cl.
CPC ............ B05B 15/62 (2018.02); B05B 12/124 (2013.01); B05B 17/0653 (2013.01); B05D 1/02 (2013.01); H04M 1/215 (2013.01)

(58) Field of Classification Search
CPC . H04B 1/3888; B05B 11/0056; B05B 7/2408; B05B 11/1011; B05B 7/0012;
(Continued)

(56) References Cited

U.S. PATENT DOCUMENTS 7,152,758 B2 * 12/2006 Fazzio ................... A45D 34/02
                                                              455/66.1
7,622,084 B2 * 11/2009 Cho ........................ H04M 1/21
                                                              422/123
(Continued)

FOREIGN PATENT DOCUMENTS

CN          2692933 Y      4/2005
CN        106941550 A      7/2017
(Continued)

OTHER PUBLICATIONS

Cameron Alder Jade, "Secure Your iPhone 15 in Style with the Smartish Wallet Case", Oct. 14, 2023, Youtube, <https://www.youtube.com/watch?v=fdJtWE5jGcM> (Year: 2023).*
(Continued)

*Primary Examiner* — Kevin Edward Schwartz
(74) *Attorney, Agent, or Firm* — ROTHWELL, FIGG, ERNST & MANBECK, P.C.

(57)                ABSTRACT
A spraying device with a frame that houses a reservoir assembly with a cavity for storing liquid, a piezoelectric atomizer configured to spray atomized liquid particles, a power source for the atomizer, a trigger for activating the atomizer, and a magnet that is configured to magnetically couple the device to a mobile device.

30 Claims, 17 Drawing Sheets

(51) Int. Cl.
  *B05B 17/06* (2006.01)
  *B05D 1/02* (2006.01)
  *H04M 1/215* (2006.01)

(58) Field of Classification Search
  CPC ...... A61L 9/14; A61L 2209/133; A61L 9/035; A61L 9/125; H04M 1/21; F41H 9/10
  USPC .................. 455/575.8; 222/78, 175; 118/300
  See application file for complete search history.

(56) References Cited

U.S. PATENT DOCUMENTS

| | | | | |
|---|---|---|---|---|
| 8,472,915 | B2 | 6/2013 | Diperna et al. | |
| 9,925,390 | B2 | 3/2018 | Yehezkel | |
| 10,571,955 | B2 * | 2/2020 | Oliveira | ................. G06F 1/1626 |
| 10,894,107 | B2 | 1/2021 | Grinstead et al. | |
| D910,451 | S | 2/2021 | Lindsey | |
| D911,848 | S | 3/2021 | Lindsey | |
| D911,849 | S | 3/2021 | Lindsey | |
| 11,065,634 | B1 * | 7/2021 | Hernandez | ......... B05B 11/0056 |
| D951,774 | S | 5/2022 | Lindsey | |
| 11,957,281 | B1 | 4/2024 | Keegan et al. | |
| 2004/0235430 | A1 | 11/2004 | Ma et al. | |
| 2006/0175431 | A1 * | 8/2006 | Renn | ...................... A62C 31/00 239/296 |
| 2007/0187436 | A1 | 8/2007 | Oran | |
| 2008/0064339 | A1 | 3/2008 | Cavalier | |
| 2009/0054116 | A1 * | 2/2009 | Hakunti | .................... A61L 9/14 239/102.1 |
| 2010/0019057 | A1 * | 1/2010 | Duru | ...................... G09F 23/00 239/289 |
| 2012/0282011 | A1 | 11/2012 | Francois | |
| 2013/0063922 | A1 | 3/2013 | La Porte et al. | |
| 2014/0204513 | A1 * | 7/2014 | Del Padre | ............... H04M 1/21 239/289 |
| 2015/0048178 | A1 * | 2/2015 | Edwards | ................. G06F 3/011 239/128 |
| 2016/0150920 | A1 | 6/2016 | Oliveira | |
| 2017/0173616 | A1 * | 6/2017 | Rocca | ...................... F41F 3/045 |
| 2021/0268533 | A1 | 9/2021 | Lee et al. | |
| 2021/0316028 | A1 * | 10/2021 | Bardonaro, Jr. | ....... A45C 11/00 |
| 2024/0283861 | A1 * | 8/2024 | Keegan | ................... H04M 1/21 |
| 2025/0017283 | A1 * | 1/2025 | Murison | ................ A24F 40/95 |
| 2025/0260435 | A1 * | 8/2025 | Hernandez | .............. H04M 1/04 |

FOREIGN PATENT DOCUMENTS

| | | | | |
|---|---|---|---|---|
| CN | 206641492 U | 11/2017 | | |
| CN | 210640935 U | 5/2020 | | |
| CN | 113014708 A | 6/2021 | | |
| CN | 113225415 A | 8/2021 | | |
| CN | 214280963 U | 9/2021 | | |
| CN | 114749322 B | 4/2023 | | |
| DE | 202005003793 U1 | 6/2005 | | |
| DE | 202008010475 U1 | 2/2009 | | |
| EP | 4112086 A1 | 1/2023 | | |
| JP | H10-66900 A | 3/1998 | | |
| KR | 10-2015-0083214 A | 7/2015 | | |
| KR | 10-2019-0068944 A | 6/2019 | | |
| KR | 10-2020302 B1 | 9/2019 | | |
| WO | WO-2020168529 A1 * | 8/2020 | ............. | A45C 11/24 |
| WO | WO-2022066374 A1 * | 3/2022 | ............. | A45D 19/02 |
| WO | WO-2025057249 A1 * | 3/2025 | ............. | A45D 34/02 |

OTHER PUBLICATIONS

Volansys; "Smart Air Freshener Solution for US-Based Consumer Electronics Company", https://web.archive.org/web/20250114022108/ https://www.volansys.com/case-study/smart-air-freshener-solution-controlled-via-mobile-app/, Sep. 19, 2017 (4 pages).

Godrej Industries Limited; "Godrej Aer Smart Matic", https://play. google.com/store/apps/details?id=com.godrejcp.aermatic&hl=en &pli=1, Jan. 5, 2026 (2 pages).

International Search Report and Written Opinion issued in PCT/US2025/052899 dated Mar. 4, 2026.

* cited by examiner

114b

| | |
|---|---|
| Storing or supplying the liquid in the cavity | 1802 |
| Attaching the device to a smartphone mobile device | 1804 |
| Engaging the trigger | 1806 |
| Adjusting the spray flow of the liquid particles | 1808 |
| Observing the coverage of the spray | 1810 |
| Deactivating the trigger | 1812 |
| Detaching the device | 1814 |

SPRAYING DEVICE AND METHODS

CROSS-REFERENCE TO RELATED APPLICATIONS

This application claims the benefit of U.S. Provisional Application No. 63/834,041, filed Feb. 13, 2025, and U.S. Provisional Application No. 63/833,602, filed Dec. 19, 2024, each of which are incorporated herein by reference in their entirety for all purposes.

BACKGROUND

Field of Invention

The present invention relates generally to liquid dispensing, spraying and atomization devices. In particular, the disclosure relates to electronically-controlled spraying devices and systems for dispensing atomized liquids such as sanitizers, fragrances, medications, and other liquids.

Discussion of the Background

In the wake of COVID-19 and with increasing awareness of hygiene, there is a growing need for portable, easy-to-use bacteria cleaning devices and solutions. When travelling away from home exposure to potentially harmful bacteria exists in public places on frequently touched surfaces like doorknobs, ATM keypads, gas pump handles and toilet seats. Given the increasing demand to minimize the number of items one needs to carry when out of one's home, there is also a need for portability when it comes to other liquids as well.

The market size for portable cleaning devices alone, including UV light and liquid spray devices, is estimated at $2.8 billion and growing. However, deficiencies in existing products are numerous. For example, UV light sources require the operator to hold the device over the area to be cleaned for 30 to 60 seconds per area, offering no evidence of the cleaned area, effectiveness, or overlap between adjacent areas. This is impractical for users "on the go" or for large surfaces like toilet seats or irregular surfaces like gas pump handles. Liquid delivery devices such as sprayers often have large reservoir assemblies, making them cumbersome to carry and many produce large moist particles which have long drying times. Additionally, existing atomized spray devices are typically larger than useful for portability. Disinfectant wipes are cumbersome, create waste and can be messy.

At the same time, many users carry personal sprays such as fragrance mists, breath fresheners, or defense sprays. However, conventional spray devices are typically stored separately, often within bags or pockets, which may limit their accessibility and convenience. In some settings, the need for rapid, one-handed deployment or discreet portability of such sprays may not be met by traditional devices.

Accordingly, there remains a need for compact and portable spraying systems that may, for example, be easily attached to and removed from a mobile device improving usability, accessibility, and/or hygiene for a variety of fluid delivery applications.

SUMMARY

In some aspects, the spraying device may include a frame, a reservoir assembly coupled to the frame, and a cavity within the reservoir assembly that is configured to store a liquid. The device may further include a piezoelectric atomizer that is configured to spray atomized liquid particles, where the sprayed atomized liquid particles are derived from the liquid stored in the reservoir assembly. The device may include a power source configured to power the atomizer, a trigger configured to activate the atomizer, and a magnet configured to magnetically couple the device to a mobile device.

In some aspects, the spraying device may further include a chamber contained within or coupled to the cavity of the reservoir assembly. The chamber may be configured to store a portion of the liquid from the reservoir assembly in a manner that positions the stored liquid substantially adjacent to the atomizer. In some aspects, the device may include a wick that delivers the liquid from the reservoir assembly to the vicinity of the atomizer. In some aspects, the device may include a valve mechanism configured to regulate the flow of liquid from the reservoir assembly into the chamber based on the orientation of the device. The valve mechanism may include a one-way valve. In some aspects, the chamber or reservoir assembly may be further coupled to a flow-blocking mechanism that is configured to prevent liquid leakage when the device is not in use. In some aspects, the flow-blocking mechanism may be mechanically coupled to the trigger such that actuation of the trigger simultaneously enables activation of the atomizer and fluidic access by releasing the flow-blocking mechanism.

In some aspects, the spraying device may include a rib structure integrated with the reservoir assembly or the frame, where the rib structure is configured to prevent leakage, resist compression and maintain the structural integrity of the reservoir assembly when subjected to external pressure. In some aspects, the reservoir assembly may be configured as a leak-proof reservoir assembly, the leak-proof configuration being achieved by combining the flow-blocking mechanism and a rib structure to resist leakage of liquid.

In some aspects, the sprayed atomized liquid particles may be between about 5 microns and about 50 microns in size. In some aspects, the liquid stored in the reservoir assembly may include a sanitizing agent, a fragrance, a breath spray, a deodorant, a cleaning spray, a beauty liquid, an insect repellent, a personal protection spray, a sunscreen, or a medication.

In some aspects, the spraying device may further include an LED configured to illuminate the atomized liquid particles produced during spraying and remain illuminated for a predetermined period of time after spraying. In some aspects, the LED may be a 495 nm blue LED and the liquid may include a fluorescent agent configured to fluoresce under the LED light to visually indicate spray coverage on a target surface. In some aspects, the predetermined period of time during which the LED remains illuminated may be approximately 10 seconds.

In some aspects, the trigger may include a sliding button that is configured to engage the frame and activate the piezoelectric atomizer. In some aspects, the trigger may include a sliding switch that is configured to prevent unintended activation of the piezoelectric atomizer.

In some aspects, the magnet may include a magnetic ring or strip. In some aspects, the metal or magnetic ring or strip may be configured to couple to a corresponding metal or magnet element of the mobile device. The device may further include a frictional surface or pad configured to enhance grip and prevent slippage of the device when magnetically coupled to the mobile device.

In some aspects, the spraying device may further include a USB-C connector configured to charge the power source.

The USB-C connector may also be configured to illuminate the reservoir assembly during charging. In some aspects, the cavity of the reservoir assembly may have a capacity of about 1 to about 25 milliliters.

In some aspects, the spraying device may include a mobile device application that is communicatively coupled to the frame via Bluetooth Low Energy (BLE). The application may be configured to adjust a flow rate of the piezoelectric atomizer. In some aspects, the flow rate may be adjusted based on a distance between the spraying device and a target surface, where the distance is determined using a camera of the mobile device. In some aspects, the mobile device application may be further configured to monitor spray coverage using a camera of the mobile device.

In some aspects, the reservoir assembly may be configured to be detachable from the frame. In some aspects, the reservoir assembly may include one or more transparent or translucent panels configured to permit visual inspection of a liquid level. In some aspects, the device may be sized to occupy a space below a rear-facing camera of the mobile device when the device is magnetically coupled thereto.

In some aspects, the spraying device may further include a wallet assembly coupled to the frame. In some aspects, the wallet assembly may include a card slot sized to receive a card, cash bills, or combination thereof. In some aspects, the wallet assembly may further include one or more retainers configured to hold the card, cash bills, or combination thereof within the slot. In some aspects, the wallet assembly may further include one or more through hole configured to facilitate removal of said card, cash bills, or combination thereof.

In some aspects, a method of spraying a liquid may include utilizing a spraying device. In some aspects, the spraying device includes a frame. In some aspects, the spraying device includes a reservoir assembly, wherein the reservoir assembly is coupled to the frame and comprises a cavity configured to store a liquid. In some aspects, the spraying device includes a piezoelectric atomizer configured to spray liquid atomized particles, wherein the atomized liquid particles are derived from the liquid stored in the reservoir assembly. In some aspects, the spraying device includes a power source configured to power the atomizer. In some aspects, the spraying device includes a trigger configured to activate the atomizer. In some aspects, the spraying device includes a magnet configured to magnetically couple the device to a mobile device. In some aspects, the method includes storing the liquid in the reservoir assembly. In some aspects, the method includes activating the trigger to energize the atomizer and facilitate a spray of the liquid.

In some aspects, the method may include attaching the spraying device to a mobile device. In some aspects, the method may include adjusting the flow of the spray. In some aspects, the method may include observing the coverage of the spray. In some aspects, the method may include deactivating the trigger to cease atomizer operation. In some aspects, the method may include detaching the spraying device from the mobile device.

In some aspects, the method may include delivering the liquid from the reservoir assembly to the atomizer via a wick or through a chamber positioned substantially adjacent to the atomizer. In some aspects, the valve mechanism may include a one-way valve.

In some aspects, the method may include operating a flow-blocking mechanism that occludes liquid flow when the trigger is disengaged and releases liquid flow when the trigger is actuated. In some aspects, the method may include resisting leakage of liquid from the reservoir assembly using a rib structure integrated into the reservoir assembly.

In some aspects, the method may include activating an LED to illuminate the atomized liquid, wherein the LED remains illuminated for a predetermined period after spraying ceases.

In some aspects, the method may include detaching and refilling the reservoir assembly prior to activating the trigger. In some aspects, the method may include adjusting the spray flow rate based on a distance between the device and a target surface, wherein the distance is determined using a mobile device camera. In some aspects, the method may include monitoring spray coverage via the mobile device camera and providing feedback to the user through a companion application.

In some aspects, the method may include attaching a wallet assembly to the spraying device. In some aspects, the wallet assembly may include a slot configured to receive and retain a card, cash bills, or a combination thereof.

Further variations encompassed within the invention are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

FIG. 4 also shows the divider 144 positioned between the reservoir assembly 104 and the chamber 106.

FIG. 6A illustrates a front perspective view of the trigger 112 in its disengaged or "locked" state. FIG. 6B shows a side view of the trigger 112 in its disengaged or "locked" state, including the longitudinal trigger track 140 in which the trigger 112 is seated to enable sliding movement. FIG. 6C shows a front perspective view of the trigger 112 in its engaged or "ready" state. FIG. 6D shows a side view of the trigger 112 in its engaged or "ready" state, including the longitudinal trigger track 140 in which the trigger 112 is seated to enable sliding movement.

FIG. 13A is a side view of the spraying device 100 magnetically coupled to a mobile device 174, wherein the spraying device 100 is aligned flush with the rear surface 178 of the mobile device 174. FIG. 13B is a side view of the spraying device 100 including an optional wallet assembly 180 comprising a card slot 182 and an internal retainer 184 configured to receive and secure one or more cards or cash bills.

FIG. 17A is a front view of the wallet assembly 180 illustrating the card slot 182, one or more retainers 184, and one or more through holes 186. FIG. 17B is a rear view of the wallet assembly 180 illustrating the card slot 182, one or more retainers 184, one or more through holes 186, and an embedded metal or magnetic ring 114*a*.

DETAILED DESCRIPTION

Figure 1:
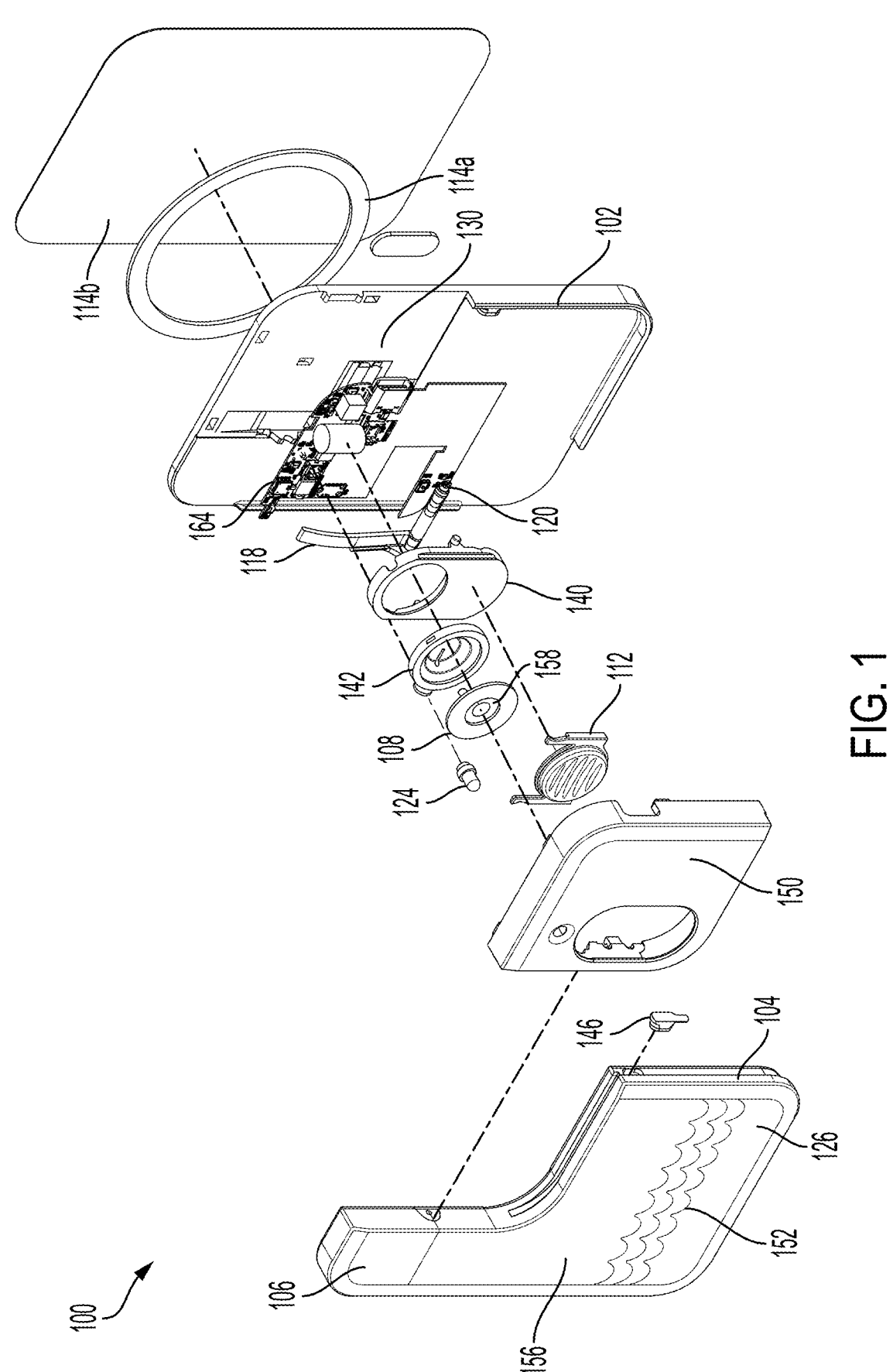
FIG. 1 is an exploded perspective view of a spraying device 100 including a frame 102, reservoir assembly 104 and cavity 156 storing liquid 152, piezoelectric atomizer 108, chamber 106, trigger 112, and associated electronic and mechanical features.

FIG. 1 is an exploded view of an exemplary spraying device 100 according to the present invention. In some embodiments, the spraying device 100 is configured to be magnetically coupled to a mobile device and to dispense a liquid 152 in atomized form for personal, medical, or hygienic applications.

In some embodiments, the spraying device 100 includes a frame 102, a reservoir assembly 104, a chamber 106, a piezoelectric atomizer 108, a power source 110, a trigger 112, and a magnetic attachment unit 114. In some embodiments, the device 100 also includes a wick 116 (see, e.g., FIG. 5), valve mechanism 118, flow-blocking mechanism 120, rib structure 122, one or more lighting components 124, control board 128, USB-C connector 130, mesh 136, fill port 138, trigger track 140, gasket 142, divider 144, fill port cap 146, rechargeable battery 162, nozzle 158, atomized liquid particles 154, liquid 152, mobile device 174, and other optional features described herein.

Figure 12:
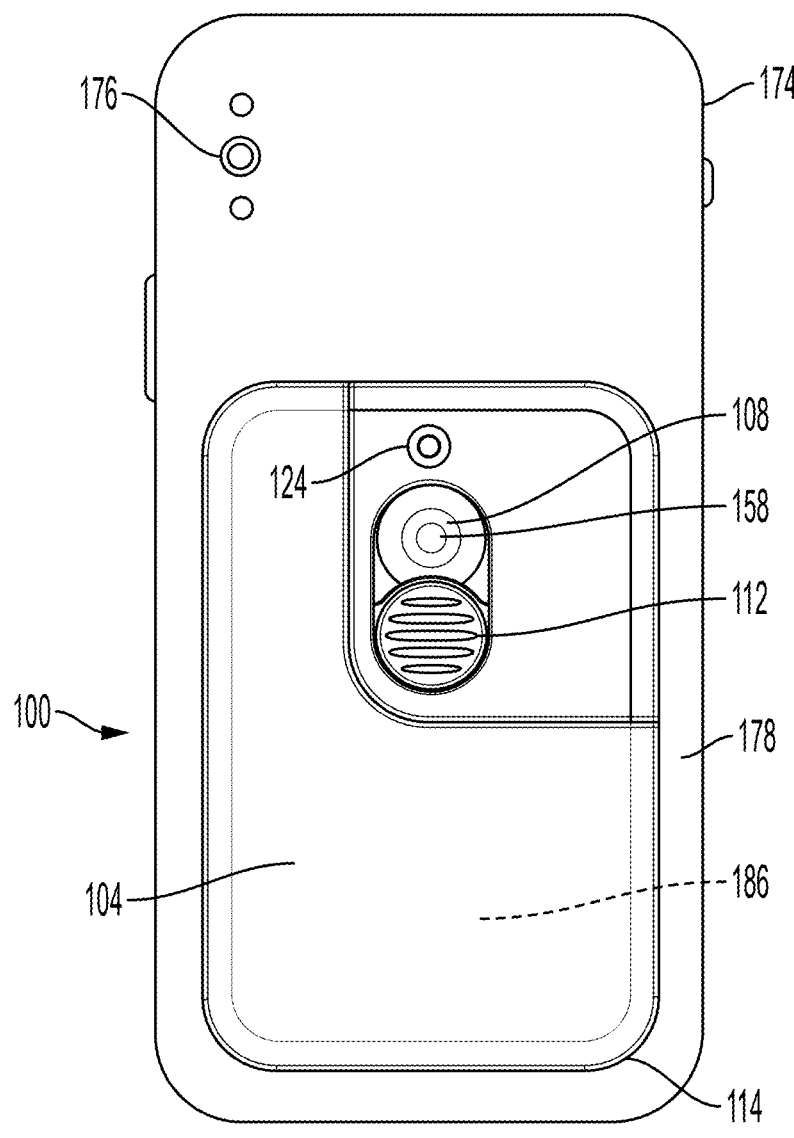
FIG. 12 is a rear view of the spraying device 100 magnetically coupled to a mobile device 174, showing the device 100 mounted on the rear surface 178 of the mobile device 174, below the rear-facing camera 176, via the magnetic attachment unit 114, including the frame 102, reservoir assembly 104, piezoelectric atomizer 108, trigger 112, and lighting components 124.

As shown in FIG. 1, and in some embodiments, the device 100 comprises a frame 102 that serves as the primary structure for securing other components. The frame 102 is generally flat and plate-like. The frame 102 may be configured for mechanical and/or magnetic coupling to the rear surface 178 of a mobile device 174 (as shown in FIG. 12). Integrated into or affixed to the frame 102 is the magnetic attachment unit 114, which includes a metal or magnetic ring 114*a* and, in some embodiments, an associated frictional surface or pad 114*b*. These components enable alignment and removable attachment to a complementary magnetic region of a mobile device 174, such as a smartphone. In some embodiments, the magnetic ring is MagSafe compatible.

In some embodiments, the spraying device 100 comprises a front enclosure 150 configured to couple to the frame 102. The front enclosure 150 may form at least a portion of the exterior surface of the device 100 and may define an opening aligned with the trigger 112 and trigger track 140 to allow user actuation. In some embodiments, a gasket 142 is positioned between the piezoelectric atomizer 108 and the trigger track 140 to provide a sealed interface and secure attachment, thereby preventing liquid 152 leakage into adjacent components and providing structural sealing. In some embodiments, the front enclosure 150 defines an opening through which atomized liquid particles 154 generated by the piezoelectric atomizer 108 are discharged. Said opening is aligned with the atomizer 108 and mesh 136. The front enclosure 150 may additionally include a transparent or translucent portion or a recessed area aligned with a lighting component 124, such as an LED, to allow illumination of the emitted atomized liquid particles 154.

In some embodiments, the front enclosure 150 is formed from a rigid or semi-rigid polymeric material to provide impact resistance while maintaining a lightweight construction. In some embodiments, the front enclosure 150 includes one or more snap-fit tabs, threaded fasteners, or magnetic couplings configured to secure the front enclosure 150 to the frame 102. When assembled, the front enclosure 150 cooperates with the frame 102 to at least partially enclose and protect internal components of the spraying device 100, including the chamber 106, piezoelectric atomizer 108, one or more lighting components 124, the control board 128, and related electrical connections to the power source 110 and USB-C connector 130.

The frame 102 is further configured to hold the one or more lighting components 124. In some embodiments, the lighting components 124 include one or more light-emitting diodes (LEDs) positioned adjacent to the piezoelectric atomizer 108. In some embodiments the lighting components 124 are configured to illuminate atomized liquid particles 154 of the liquid 152 during the time the atomized liquid particles 154 are spraying or otherwise being ejected from the device 100.

In some embodiments, the lighting components 124 such as LEDs may emit light at a wavelength of approximately 350 nm, 495 nm, or 540 nm, selected based on the excitation profile of a fluorescent agent contained in the liquid 152. The emitted wavelength of the lighting components 124 such as LEDs may enhance visibility of the spray or to excite fluorescent agents contained in the liquid 152. In some embodiments, the LEDs may emit light in other ranges suitable for fluorescent excitation, including ultraviolet (e.g., 320-400 nm), visible blue (e.g., 440-490 nm), green (e.g., 495-550 nm), or other colors as appropriate. In some embodiments, the lighting components 124 are electrically coupled to the control board 128 for activation in coordination with the trigger 112, and may remain illuminated for a predetermined duration after spraying ceases. In some embodiments, the lighting components 124 are mounted within the front enclosure 150 to project light through an opening toward a target surface 182. The charging components such as USB-C connector 130 and control board 128 include electrical contacts and circuitry for transferring power from an external charging source to the power source 110, including through the USB-C connector 130. In some embodiments, the control board 128 includes charging circuitry configured to route power from the USB-C connector 130 to the rechargeable battery 162.

In some embodiments, the spraying device 100 includes a control board 128 disposed within the frame 102 or the front enclosure 150. In some embodiments, the control board 128 is a printed circuit board or motherboard that provides electronic control and coordination of the system components described herein.

In some embodiments, the control board 128 interfaces with the power source 110 to regulate electrical power delivery to the piezoelectric atomizer 108, the lighting components 124, and other active elements of the device 100. In certain embodiments, the control board 128 communicates with a mobile device 174 via a Bluetooth Low Energy (BLE) transceiver to receive operational commands, adjust atomization parameters, or monitor system performance. In some embodiments, the control board 128 processes input from the trigger 112 to activate or deactivate the atomizer 108 and associated components.

In some embodiments, the control board 128 includes integrated circuitry for LED timing control, flow rate adjustment, and battery charging management through the USB-C connector 130. In some embodiments, the control board 128 is electrically coupled to sensors, such as distance or orientation sensors, for implementing features such as spray optimization based on target distance and surface type.

In some embodiments, the system comprises a reservoir assembly 104 positioned forward of the frame 102 that may be fixed, or in some embodiments, removably coupled to the frame using one or more mechanical fastening or snap-fit mechanisms, adhesive bonding, magnetic coupling, or thermal welding.

In some embodiments, the reservoir assembly 104 includes a cavity 156 configured to store a liquid 152. The cavity 156 may have a capacity of about 1 to about 25 milliliters (mL). In some embodiments, the cavity 156 of the reservoir assembly 104 has a capacity of between 1 to 3, 2 to 4, 3 to 5, 4 to 6, 5 to 7, 6 to 8, 7 to 9, 8 to 10, 9 to 11, 10 to 12, 11 to 13, 12 to 14, 13 to 15, 14 to 16, 15 to 17, 16 to 18, 17 to 19, 18 to 20, 19 to 21, 20 to 22, 21 to 23, 22 to 24, and 23 to 25 mL. In some embodiments, the cavity 156 of said reservoir assembly 104 has a capacity of about 1, about 2, about 3, about 4, about 5, about 10, about 15, about 20, or about 25 mL. In some embodiments, the cavity of said reservoir assembly 104 has a capacity of between about 1 and about 5, about 1 and about 10, about 5 and about 15, about 5 and about 20, about 1 and about 20, or about 5 and about 25 mL. In some embodiments, the reservoir assembly 104 is transparent, partially transparent, or includes one or more translucent panels 126 to facilitate visual inspection of the liquid 152 level.

Figure 4:
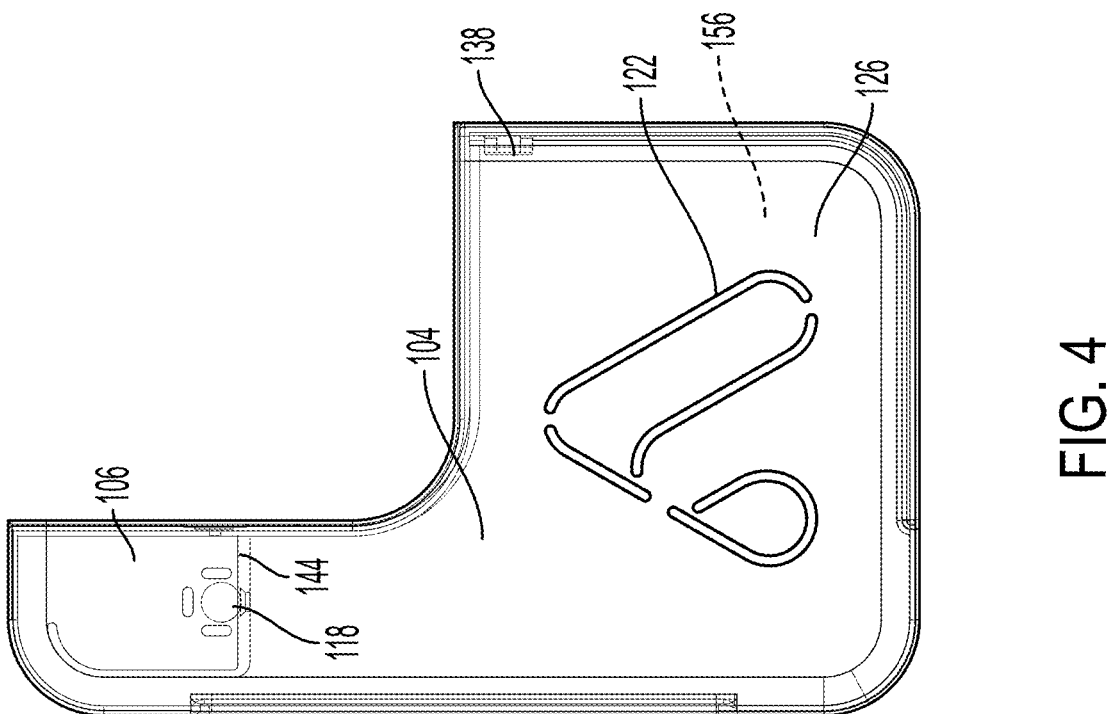
FIG. 4 is a partial cutaway front view of the reservoir assembly 104, further illustrating the chamber 106 and valve mechanism 118 positioned between the reservoir assembly 104 and the atomizer 108 and configured to store a portion of liquid in close proximity to the atomizing device, including the fill port 138.

In some embodiments, and as shown in FIGS. 1 and 4, the reservoir assembly 104 has a chamber 106 integrated or nested within it.

In some embodiments, the chamber 106 is located adjacent to the atomizer 108 and in proximity to the reservoir assembly 104. In some embodiments, the chamber 106 is removable. In some embodiments, the chamber 106 is molded in. In some embodiments, the chamber 106 is configured to store a portion of the liquid 152 in proximity to the atomizer 108 to facilitate efficient atomization.

In some embodiments, the piezoelectric atomizer 108 is located at or near the distal end of the reservoir assembly 104. The atomizer 108 may be integrated into a nozzle structure 158 through which the atomized liquid particles 154 are emitted. In some embodiments, the atomizer 108 is electrically connected to a power source 110, such as a rechargeable battery 162, which may be housed within the frame 102 or integrated into an electronics module 164. In some embodiments, a USB-C connector 130 is included to charge the power source 110 and, in some cases, provide illumination for the reservoir assembly 104 during charging.

In some embodiments, the piezoelectric atomizer 108 includes a mesh element 136 positioned at the nozzle structure 158 of the atomizer. The mesh 136 may be configured to modulate the size of the atomized liquid particles 154 generated during operation as shown, for example, in FIG. 2. In some embodiments, the mesh 136 comprises a microperforated membrane or metallic mesh having apertures of a predetermined size, through which the liquid is forced during actuation of the piezoelectric element. The mesh 136 may enhance consistency in droplet size and may assist in generating a fine spray of atomized liquid particles with a target particle size distribution, such as between about 5 and about 50 microns. In some embodiments, the target particle size is about 0.1, about 0.5, about 1, about 1.5, about 2, about 2.5, about 3, about 4, about 5, about 6, about 7, about 8, about 9, about 10, about 12, about 15, about 18, about 20, about 25, about 30, about 35, about 40, about 45, or about 50 microns. In some embodiments, the target particle size is within a range selected from 0.1 and 1, 0.5 and 1.5, 1.0 and 2.0, 1.5 and 2.5, 2.0 and 3.0, 2.5 and 3.5, 3.0 and 4.0, 3.5 and 4.5, 4.0 and 5.0, 4.5 and 5.5, 5.0 and 6.0, 5.5 and 6.5, 6.0 and 7.0, 6.5 and 7.5, 7.0 and 8.0, 7.5 and 8.5, 8.0 and 9.0, 8.5 and 9.5, 9.0 and 10.0, 9.5 and 10.5, 10.0 and 11.0, 10.5 and 11.5, 11.0 and 12.0, 11.5 and 12.5, 12.0 and 13.0, 12.5 and 13.5, 13.0 and 14.0, 13.5 and 14.5, 14.0 and 15.0, 14.5 and 15.5, 15.0 and 16.0, 15.5 and 16.5, 16.0 and 17.0, 16.5 and 17.5, 17.0 and 18.0, 17.5 and 18.5, 18.0 and 19.0, 18.5 and 19.5, 19.0 and 20.0, 19.5 and 20.5, 20.0 and 21.0, 20.5 and 21.5, 21.0 and 22.0, 21.5 and 22.5, 22.0 and 23.0, 22.5 and 23.5, 23.0 and 24.0, 23.5 and 24.5, 24.0 and 25.0, 24.5 and 25.5, 25.0 and 26.0, 25.5 and 26.5, 26.0 and 27.0, 26.5 and 27.5, 27.0 and 28.0, 27.5 and 28.5, 28.0 and 29.0, 28.5 and 29.5, 29.0 and 30.0, 29.5 and 30.5, 30.0 and 31.0, 30.5 and 31.5, 31.0 and 32.0, 31.5 and 32.5, 32.0 and 33.0, 32.5 and 33.5, 33.0 and 34.0, 33.5 and 34.5, 34.0 and 35.0, 34.5 and 35.5, 35.0 and 36.0, 35.5 and 36.5, 36.0 and 37.0, 36.5 and 37.5, 37.0 and 38.0, 37.5 and 38.5, 38.0 and 39.0, 38.5 and 39.5, 39.0 and 40.0, 39.5 and 40.5, 40.0 and 41.0, 40.5 and 41.5, 41.0 and 42.0, 41.5 and 42.5, 42.0 and 43.0, 42.5 and 43.5, 43.0 and 44.0, 43.5 and 44.5, 44.0 and 45.0, 44.5 and 45.5, 45.0 and 46.0, 45.5 and 46.5, 46.0 and 47.0, 46.5 and 47.5, 47.0 and 48.0, 47.5 and 48.5, 48.0 and 49.0, 48.5 and 49.5, and 49.0 and 50.0 microns. In some embodiments, the target particle size is 0.1, 0.5, 1, 1.5, 2, 2.5, 3, 4, 5, 6, 7, 8, 9, 10, 15, 20, 25, 30, 35, 40, 45, or 50 microns.

In some embodiments, the mesh 136 of the atomizer 108 is interchangeable or tunable to accommodate different liquid 152 formulations or application requirements. For example, a coarser mesh may be selected for higher viscosity liquids 152 such as gel-based medicaments or sunscreens, while a finer mesh may be used for volatile or low-viscosity liquids 152 such as alcohol-based sanitizers or perfumes. In some embodiments, the mesh is fixed in place, while in others it is removably mounted to allow for replacement or cleaning. The selection or adjustment of mesh aperture size may be manual or electronically controllable via signals from the smartphone application 200, allowing the user to configure or optimize spray characteristics of the atomized liquid particles 154 depending on the selected use case or environmental condition. In some embodiments, the mesh 136 may be interchangeable or may include regions of different mesh density to provide atomization control. In some embodiments, the mesh 136 may also be designed to resist clogging or contamination by lint or debris.

In some embodiments, the device 100 is configured for use with a wide range of atomizable liquids 152. These may include sanitizing agents, fragrances, breath fresheners, deodorants, cleaning agents, beauty formulations, insect repellents, personal protection sprays such as mace or bear spray, sunscreens, and medications. The cavity 156 of the reservoir assembly 104 may be operably filled with such liquids 152 depending on the user's intended application. In some embodiments, the piezoelectric atomizer 108 is configured to support atomization of both alcohol-based and water-based liquids, and the output particle size may be in the range of about 5 to about 50 microns. In some embodiments, the output particle size may be about 0.1, about 0.5, about 1, about 1.5, about 2, about 2.5, about 3, about 4, about 5, about 6, about 7, about 8, about 9, about 10, about 12, about 15, about 18, about 20, about 25 about 30, about 35, about 40, about 45, or about 50 microns. In some embodiments, the output particle size may be within a range selected from 0.1 and 1, 0.5 and 1.5, 1.0 and 2.0, 1.5 and 2.5, 2.0 and 3.0, 2.5 and 3.5, 3.0 and 4.0, 3.5 and 4.5, 4.0 and 5.0, 4.5 and 5.5, 5.0 and 6.0, 5.5 and 6.5, 6.0 and 7.0, 6.5 and 7.5, 7.0 and 8.0, 7.5 and 8.5, 8.0 and 9.0, 8.5 and 9.5, 9.0 and 10.0, 9.5 and 10.5, 10.0 and 11.0, 10.5 and 11.5, 11.0 and 12.0, 11.5 and 12.5, 12.0 and 13.0, 12.5 and 13.5, 13.0 and 14.0, 13.5 and 14.5, 14.0 and 15.0, 14.5 and 15.5, 15.0 and 16.0, 15.5 and 16.5, 16.0 and 17.0, 16.5 and 17.5, 17.0 and 18.0, 17.5 and 18.5, 18.0 and 19.0, 18.5 and 19.5, 19.0 and 20.0, 19.5 and 20.5, 20.0 and 21.0, 20.5 and 21.5, 21.0 and 22.0, 21.5 and 22.5, 22.0 and 23.0, 22.5 and 23.5, 23.0 and 24.0, 23.5 and 24.5, 24.0 and 25.0, 24.5 and 25.5, 25.0 and 26.0, 25.5 and 26.5, 26.0 and 27.0, 26.5 and 27.5, 27.0 and 28.0, 27.5 and 28.5, 28.0 and 29.0, 28.5 and 29.5, 29.0 and 30.0, 29.5 and 30.5, 30.0 and 31.0, 30.5 and 31.5, 31.0 and 32.0, 31.5 and 32.5, 32.0 and 33.0, 32.5 and 33.5, 33.0 and 34.0, 33.5 and 34.5, 34.0 and 35.0, 34.5 and 35.5, 35.0 and 36.0, 35.5 and 36.5, 36.0 and 37.0, 36.5 and 37.5, 37.0 and 38.0, 37.5 and 38.5, 38.0 and 39.0, 38.5 and 39.5, 39.0 and 40.0, 39.5 and 40.5, 40.0 and 41.0, 40.5 and 41.5, 41.0 and 42.0, 41.5 and 42.5, 42.0 and 43.0, 42.5 and 43.5, 43.0 and 44.0, 43.5 and 44.5, 44.0 and 45.0, 44.5 and 45.5, 45.0 and 46.0, 45.5 and 46.5, 46.0 and 47.0, 46.5 and 47.5, 47.0 and 48.0, 47.5 and 48.5, 48.0 and 49.0, 48.5 and 49.5, and 49.0 and 50.0 microns.

In some embodiments, the piezoelectric atomizer 108 may be configured to precisely adjust the output particle size of the atomized liquid particles 154 within these ranges, enabling consistent spray characteristics for different liquids, formulations, or use conditions, while maintaining the target particle size distribution for optimal atomized liquid particle 154 performance, including facilitating rapid drying and even surface distribution. This disclosure is not limited to any particular formulation, and a variety of commercially available or custom-developed liquids may be used.

In some embodiments, and as shown in FIG. 1, the trigger 112 is disposed on the outer surface of the device 100, accessible to the user. The trigger 112 may be configured to activate the atomizer. The trigger 112 may be mechanically coupled to the flow-blocking mechanism 120. In some embodiments, the trigger 112 is configured as a button, such as a sliding button, that can be operably pressed by a user to energize the atomizer 108. In some embodiments, the trigger 112 is configured as a sliding button that is movable along the trigger track 140 between a locked position and an unlocked position. In further embodiments, the trigger 112 includes a sliding switch that is movable between a locked state and an unlocked state to prevent unintended activation; the sliding switch may be disposed adjacent to, integrated with, or concentric to the button or slider. In some embodiments, the trigger 112 comprises both a sliding button and a sliding switch, wherein the sliding button enables user actuation of the atomizer 108 and the sliding switch provides a locking or safety feature to prevent unintended activation. In some embodiments, the trigger 112 can be both slid and pressed, either sequentially or simultaneously, with the sliding switch establishing the locked or unlocked state and the pressing and/or sliding action initiating atomizer operation when unlocked. In additional embodiments, the trigger 112 is configured as a button, a sliding button, a sliding switch, or a combination of sliding button and sliding switch, with the sliding switch providing a lockout function across these configurations. In some embodiments, the sliding feature provides a locking or safety function that prevents unintended activation of the atomizer 108 when the trigger 112 is in a disengaged or "locked" position. In some embodiments, the pressing feature of the trigger 112 provides direct ergonomic actuation of the atomizer 108. These configurations provide flexibility in operation while maintaining reliable atomizer activation and user safety. In some configurations, the trigger 112 is protected by a sliding guard along the trigger track 140 or is recessed in the track 140 to prevent accidental activation.

In some embodiments, the sliding portion of the trigger 112 additionally functions as a protective cover for the atomizer 108 and nozzle structure 158. When in the locked position, the trigger 112 may extend across or adjacent to the nozzle structure 158, thereby shielding the mesh 136 from impact damage, preventing ingress of dust, lint, or other contaminants, and reducing the risk of clogging. In some embodiments, the trigger 112 further enhances leak protection by physically obstructing the nozzle structure 158 opening when in the locked state.

In some embodiments, movement of the trigger 112, for example, from the locked to the unlocked position, requires a substantial or intentional user action, such as linear displacement along the track 140, thereby reducing the likelihood of inadvertent activation during transport or handling. When moved to the unlocked position, the trigger 112 exposes the nozzle structure 158 and simultaneously enables the actuation of the atomizer 108 through pressing or additional sliding of the trigger 112.

Figure 2:
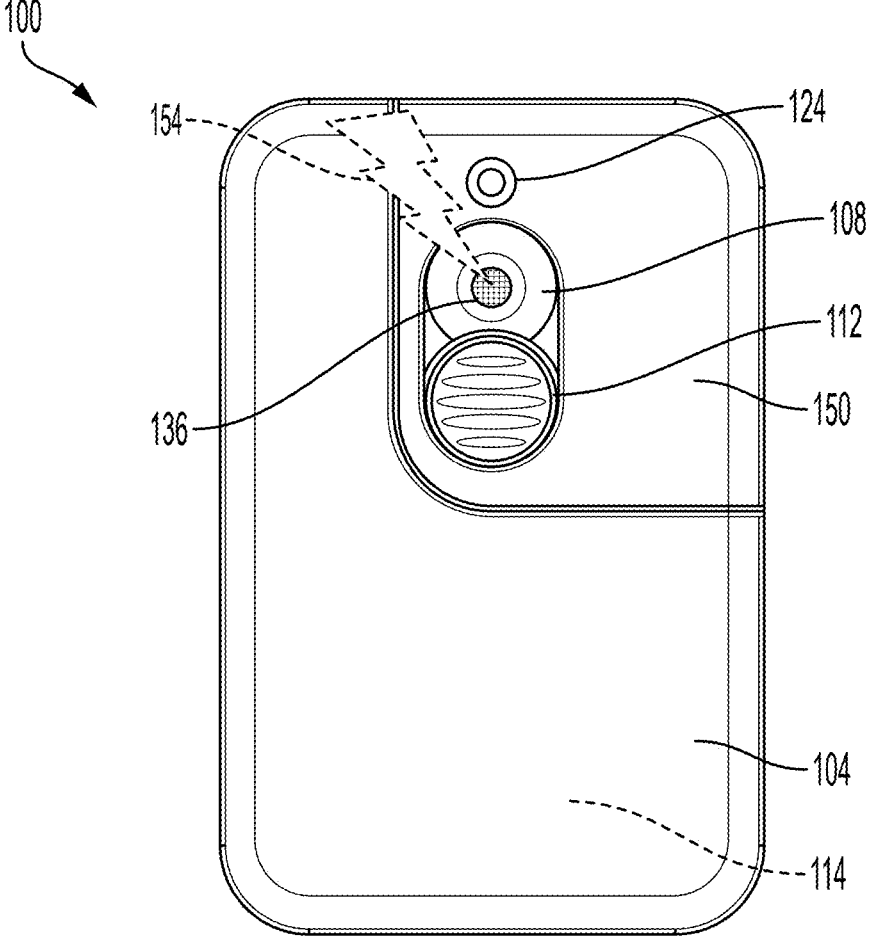
FIG. 2 is a front perspective view of the assembled spraying device 100, showing the device in a magnetically mountable orientation relative to a mobile device 174, and including visible external elements including the trigger 112 and mesh 136.
Figure 3:
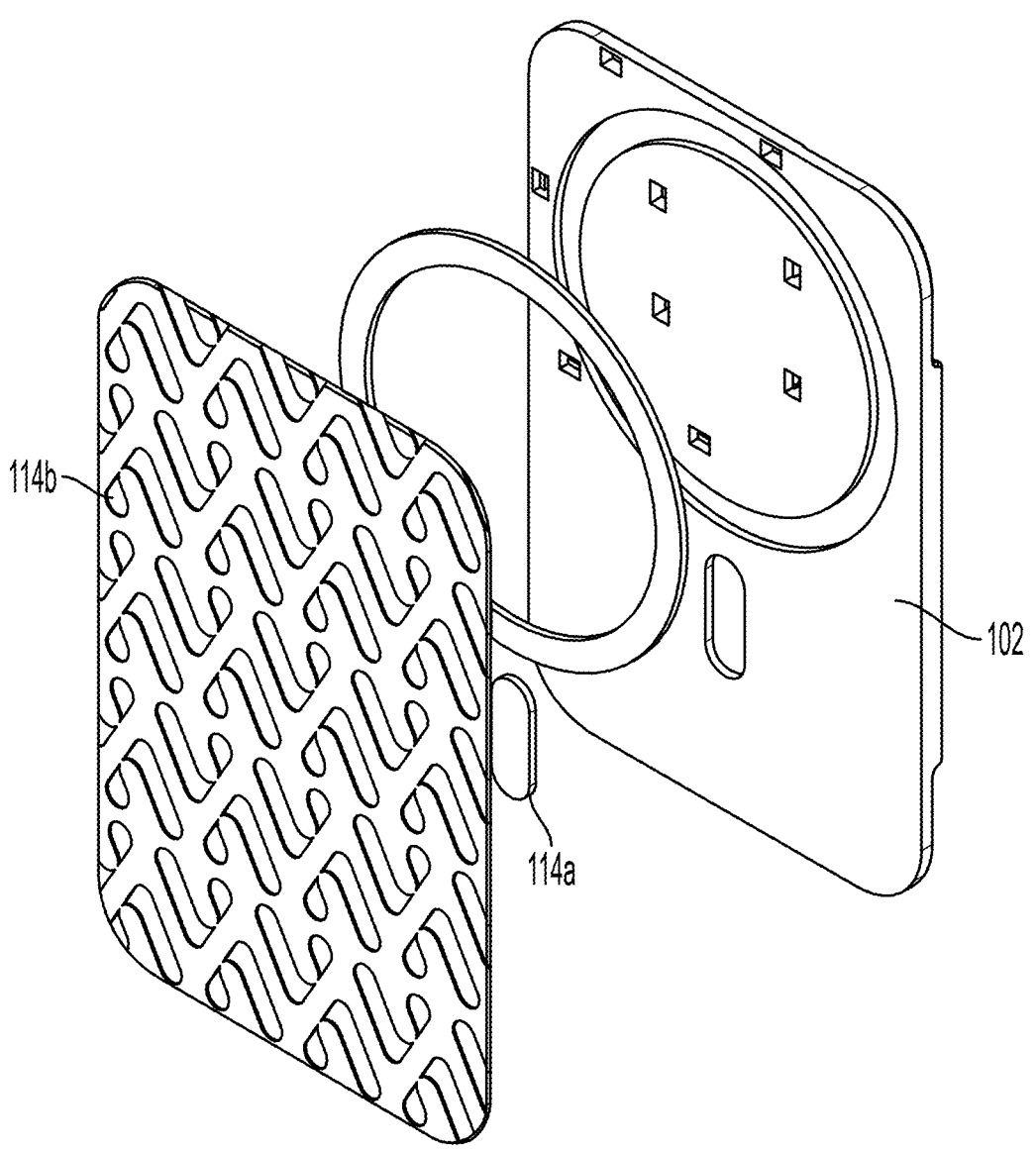
FIG. 3 is a rear view of the spraying device 100 illustrating the frictional surface or pad 114b and embedded metal or magnetic ring 114a positioned for magnetic attachment to a mobile device 174.

FIG. 2 shows a front view of the fully assembled device 100. In some embodiments, the reservoir assembly 104 forms the outward-facing body, while the nozzle structure 158 is visible near the top. In some embodiments, the trigger 112 is located on the side or front surface, ergonomically positioned for thumb or finger activation. In some embodiments, the trigger 112 includes a ribbed or textured grip to improve ease of use.

In some embodiments, the atomizer 108 is internal and positioned near the top edge of the reservoir assembly 104, aligned with the outlet to ensure the spray of atomized liquid particles 154 is directed outward and upward from the device when magnetically attached to a mobile device 174. As shown in FIG. 12, the device 100 may be shaped and dimensioned to occupy only a limited portion of the mobile device 174 rear surface, for example, below the rear-facing camera 176, such that the spraying device 100 does not obscure the camera 176 or other mobile device 174 functions when attached.

In some embodiments, a frictional surface or pad 114b (made of rubber, polymers, or other materials understood to increase friction) is integrated over or around the metal or magnetic ring 114a, providing a device 100 attachment unit 114 that includes both a magnetic attraction force between the device 100 and mobile device 174 (wherein each of the ring 114a and/or the corresponding element 186 on the mobile device 174 can be metal and/or magnetic material) and an increased friction force between the device and mobile device surfaces caused by the frictional surface or pad 114b. This thereby causes the device 100 to remain reasonably secured to the mobile device 174 and overall slippage between the device 100 and mobile device 174 to be reduced. In some embodiments, the friction surface or pad 114b may also assist in shock absorption or sealing when pressed against the rear surface 178 of the mobile device 174.

In some embodiments, the frictional surface or pad 114b improves grip and resistance to slippage when the device is magnetically attached to a mobile device. For example, the frictional surface 114b may reduce accidental detachment when the combined unit is placed into a pocket or backpack. The combination of metal or magnetic ring 114a and frictional surface or pad 114b may allow both secure attachment and easy removal, enhancing device 100 performance and user convenience.

As shown in FIG. 4, in some embodiments, the reservoir assembly 104 includes a chamber 106. In some embodiments, the chamber 106 is a separate internal compartment encompassed within the reservoir assembly 104 and located in a top section of the reservoir assembly 104 and is proximate to the piezoelectric atomizer 108. The positioning of the chamber 106 is such that it is sufficient to hold a quantity of liquid 152 such that the atomizer 108 can access the liquid 152 whether the device is held in a vertical, horizontal, upside down, or any other position. In some embodiments, the reservoir assembly 104 includes one or more translucent panels 126 configured to allow visibility into the reservoir assembly 104 and cavity 156.

In some embodiments, and as shown in FIG. 4, a divider 144 is positioned between the reservoir assembly 104 and the chamber 106. In such an embodiment, the divider 144 incorporates the valve mechanism 118 to regulate liquid flow between the two components. For example, in some embodiments, liquid 152 is stored in the cavity 156. The device 100 is configured such that the user can turn the device 100 upside down or non-vertically such that a portion of the liquid 152 enters the chamber 106 by operation of gravity, filling, or partially filling the chamber 106 by operation of the valve 118, which in some embodiments is a one-way valve, orientation-sensitive, gravity-responsive valve, and/or ball valve, configured to allow liquid 152 to flow from the cavity 156 of the reservoir assembly 104 into the chamber 106 based on the orientation of the spraying device 100, while preventing backflow of the liquid 152 into the cavity 156 of the reservoir assembly 104. Once the liquid is stored in the chamber 106 in this manner, and the device 100 is turned vertically or in another position that would otherwise cause the flow of liquid by gravity, the liquid in the chamber 106 is prevented from releasing back into the cavity 156 by operation of the one-way valve. With the liquid 152 stored in the cavity 156, and in proximity to the atomizer 108, the atomizer 108 is able to access the liquid 152 and spray the atomized liquid particles 154 regardless of what position the device 100 is in and without the need for a wick. In some embodiments, the valve mechanism 118 is embedded in a flow port at the junction between the cavity 156 and chamber 106.

Figure 5:
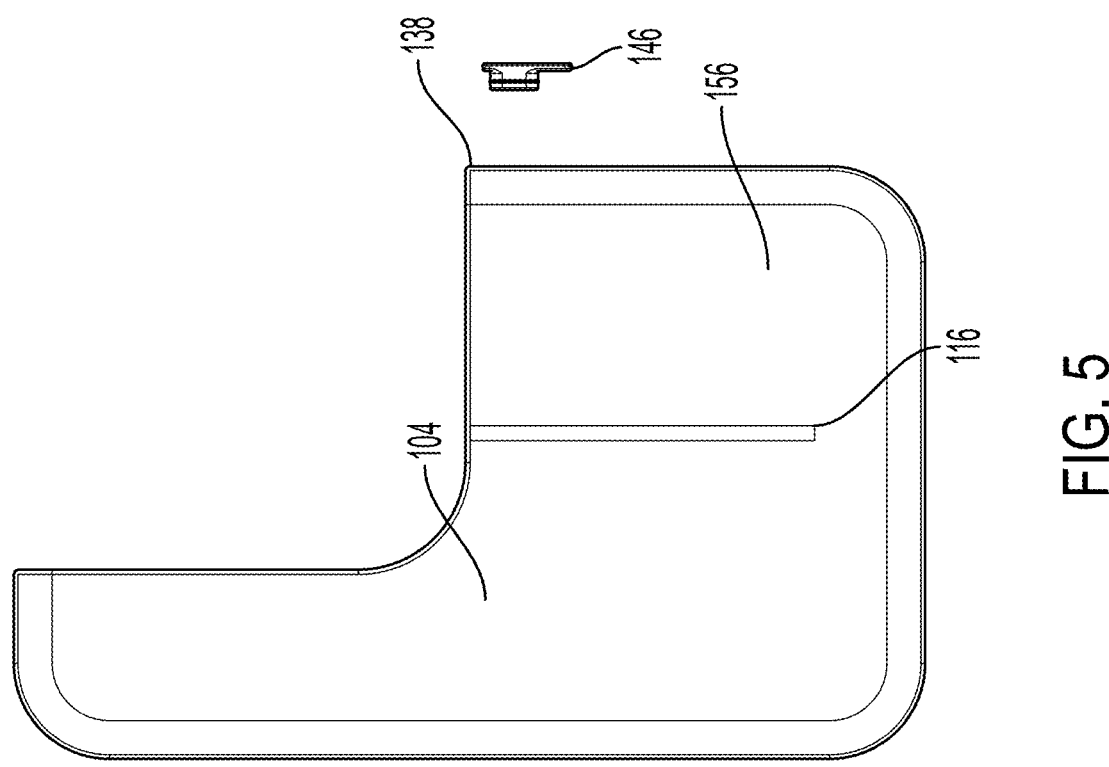
FIG. 5 is a partial cutaway front view of the reservoir assembly 104 including a wick 116, with the fill port cap 146 removed.

In other embodiments, and as shown in FIG. 5, the divider 144 is omitted, and the liquid 152 is instead conveyed from the cavity 156 of the reservoir assembly 104 to the chamber 106 via a wick 116. In some embodiments, the divider 144 also functions as a sealing barrier to hold the quantity of liquid reduce contamination between compartments, for example, between the cavity 156 and the chamber 106.

As shown in FIG. 5, in some embodiments, the reservoir assembly 104 has a fill port 138 and removable fill port cap 146. In some embodiments, the reservoir assembly 104 is illuminated by the lighting component 124, such as an LED, and as shown, for example, in FIG. 1. The lighting component 124 may further be positioned to emit light through the atomized liquid particles 154 during operation or to illuminate the spray target. In some embodiments a wick 116 is provided to deliver liquid from the cavity 156 (or in some embodiments the chamber 106) to the atomizer 108. The wick 116 may be a fibrous or porous material positioned within the cavity 156 of the reservoir assembly 104.

FIGS. 6A-D present close-up views of the trigger 112 and trigger track 140. As shown in FIGS. 6A-D, the trigger 112 can be seated within the track 140 and positioned in either a disengaged (FIGS. 6A-B) or an engaged (FIGS. 6C-D) state. In some embodiments, the trigger 112 includes a button and/or slider that engages internal contacts or linkages along the track 140 when actuated. The sliding portion may include a physical stop or ridge 148 to provide tactile detents and to define locked and unlocked positions along the track 140. In some embodiments, the trigger 112 further includes a sliding switch that travels within the trigger track 140 between a locked position (e.g., FIGS. 6A-6B) and an unlocked position (e.g., FIGS. 6C-6D). When the sliding switch is in the locked position, depression of the button and/or movement of the slider does not energize the piezoelectric atomizer 108; when the sliding switch is in the unlocked position, pressing the button and/or sliding along the track 140 energizes the atomizer 108. In slider-only configurations, the sliding switch can be integrated into the slider such that a first detent corresponds to the locked state and a subsequent detent corresponds to the unlocked state; in button-only or button-plus-slider configurations, the sliding switch may be adjacent to the button and establishes the lockout state independently of button travel. In some embodiments, when the trigger 112 is in the locked state, attempted pressing of the button does not activate the atomizer 108. In other embodiments, when the trigger 112 is in the unlocked state, pressing or sliding of the trigger 112 results in activation of the atomizer 108. The trigger track 140 may also be linked to a dual-function trigger and LED activation circuit, allowing simultaneous control of the atomizer 108 and lighting component 124. The trigger track 140 may be recessed into the frame 102 or designed to sit flush to maintain a minimal device profile.

Figures 6A, 6B, 6C, 6D:
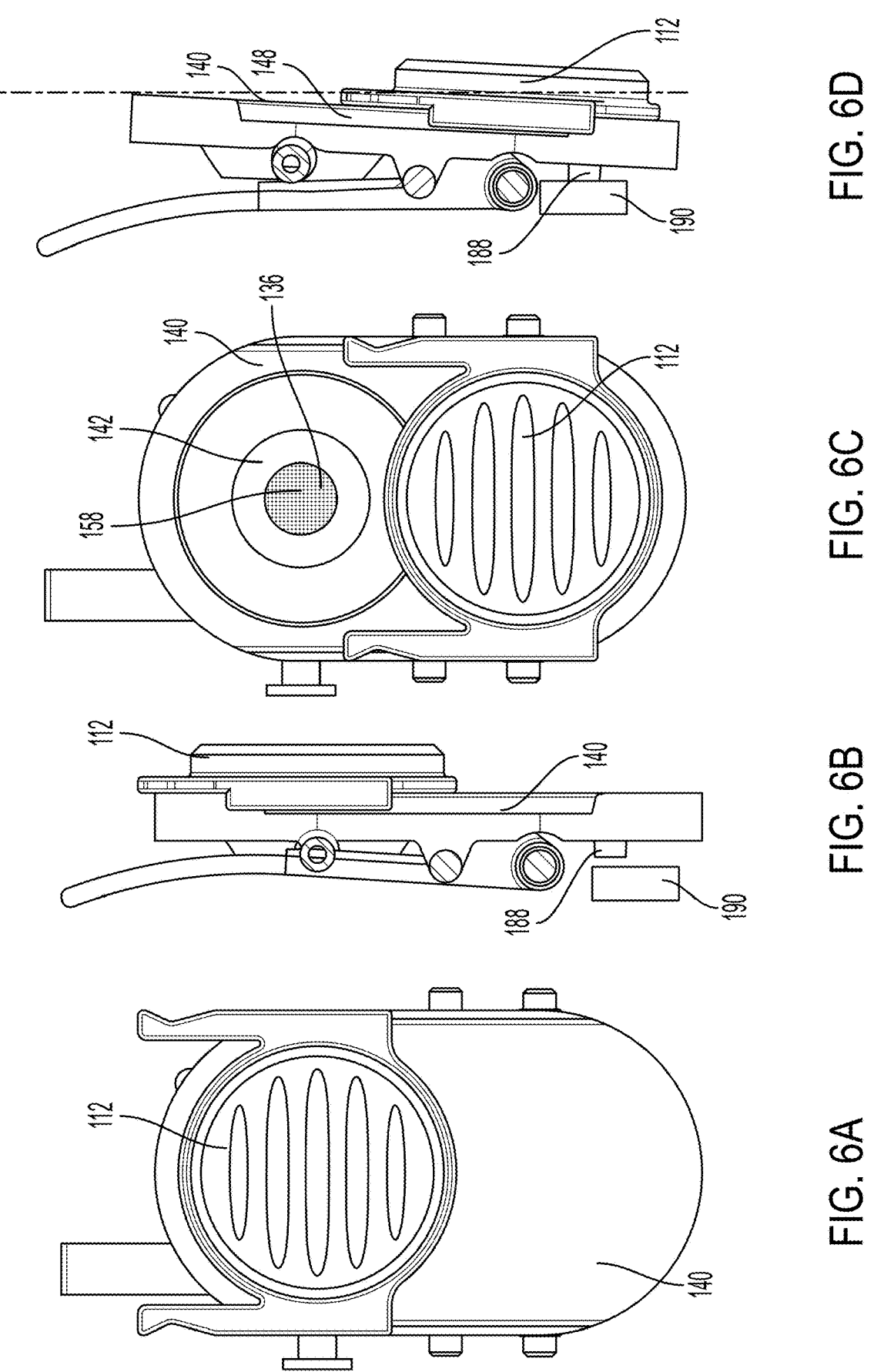
FIGS. 6A-6D are perspective views of the trigger 112 on a trigger track 140 configured to activate the atomizer 108.

In some embodiments, the trigger 112 further includes an actuation post 188 disposed beneath an exterior plastic surface of the frame 102 or front enclosure 150. The actuation post 188 is positioned such that, when the trigger 112 is depressed or pressed, the actuation post 188 transmits force to a corresponding switch or button 190 located on the control board 128. FIG. 6B shows the trigger 112 in a "closed" or "inactive" configuration wherein the actuation post 188 does not engage the switch or button 190. FIG. 6D shows the trigger 112 in an "open" or "active" configuration wherein the actuation post 188 can operably engage the corresponding switch or button 190. This recessed configuration of the actuation post 188 conceals the actual on/off contact point beneath the front housing 150, thereby reducing the likelihood of accidental or unintentional activation. In some embodiments, the actuation post 188 also serves to protect the underlying switch from debris, lint, or mechanical impact while still enabling deliberate user actuation of the piezoelectric atomizer 108.

In some embodiments, the device 100 is communicatively paired with a mobile device 174 via Bluetooth Low Energy (BLE). A companion mobile application 200 may be configured to monitor or control various features of the device. These may include adjusting the flow rate of the atomizer 108, toggling the lighting component 124, setting spray durations, or engaging a child-proof mode. In some embodiments, the application 200 receives image input from a rear-facing mobile device camera to monitor spray coverage. Fluorescent agents in the liquid 152 may enable visual confirmation of surface coverage under lighting component 124 illumination. In further embodiments, the application 200, using input from the camera 176 of the mobile device 174, analyzes distance to target surfaces 182 using camera 176 input and adjust spray intensity accordingly.

Figure 7:
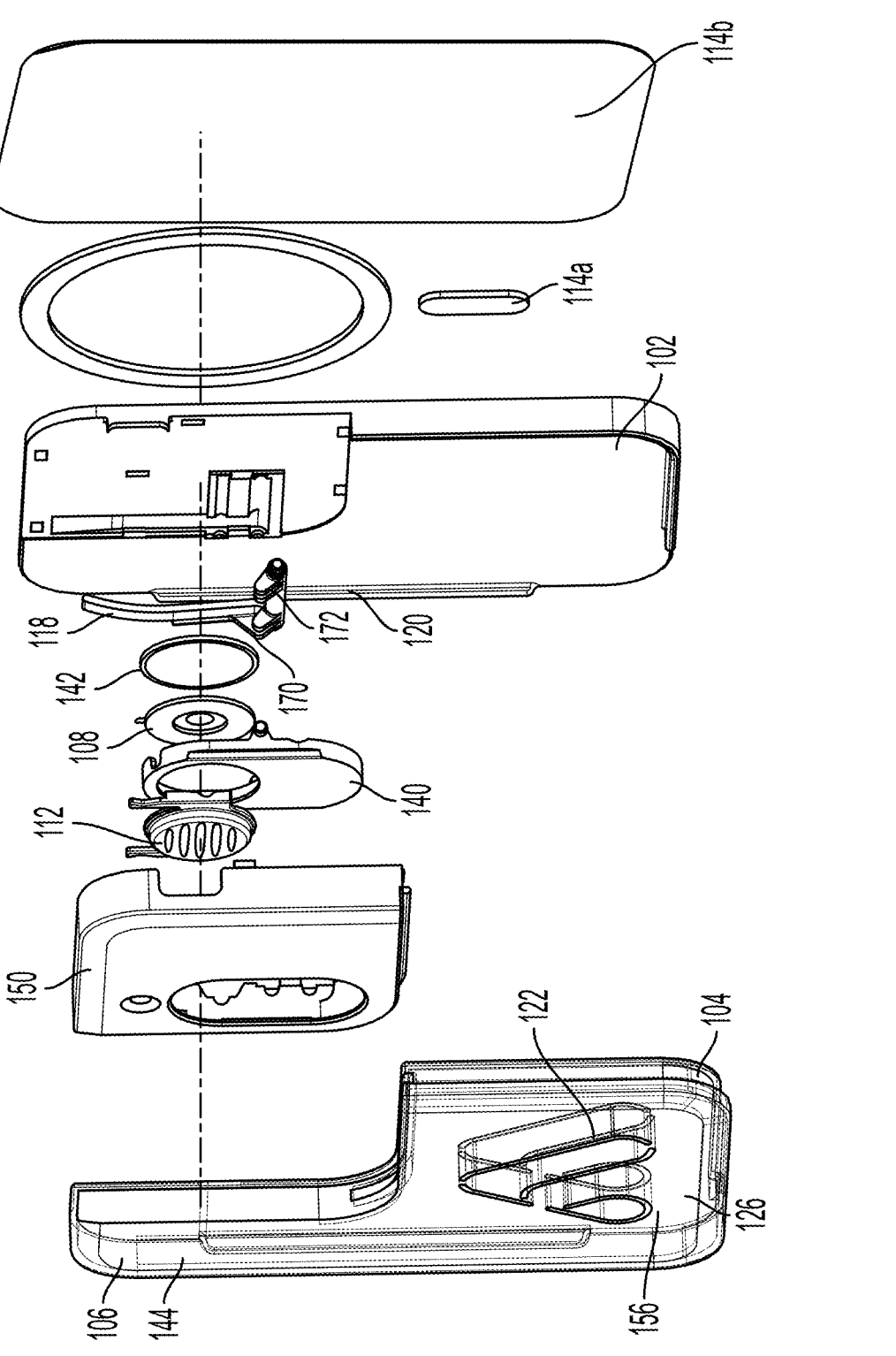
FIG. 7 is an exploded view of the spraying device 100 including the reservoir assembly 104. In this view, the translucent panels 126 are visible, allowing for visual inspection of the liquid 152 level.

In some embodiments, and as shown in FIG. 7, the spraying device 100 includes a flow-blocking mechanism 120 configured to prevent liquid leakage of the liquid 152 when the device 100 is not in use. In one embodiment, when the trigger 112 is disengaged, the flow-blocking mechanism 120 automatically occludes a fluid path between the reservoir assembly 104 and the piezoelectric atomizer 108. When the trigger 112 is actuated, the flow-blocking mechanism 120 disengages to allow liquid 152 to reach the atomizer 108 for spraying. Upon release or deactivation of the trigger 112, the flow-blocking mechanism 120 re-engages to prevent leakage. In some embodiments, the flow-blocking mechanism 120 comprises a pinch-valve structure or a self-crimping mechanism configured to compress a portion of tubing or conduit 170 connected between the reservoir assembly 104 and the atomizer 108.

In some embodiments, self-crimping as applied to the flow-blocking mechanism 120 includes, in the default or resting state (e.g., when the trigger 112 is not actuated), a clamp 172, and/or the elastic memory of the conduit segment 170 imposes a compressive force sufficient to occlude or substantially occlude liquid flow.

Upon movement of the trigger 112 from a disengaged or "locked" position to an engaged or "ready" position, a linked motion reduces or releases the compressive force, allowing controlled liquid transfer toward the atomizer 108. In some embodiments, the flow-blocking mechanism 120 is purely mechanical, such as a spring-biased clamp 172 or rigid support element, while in other embodiments it exploits the inherent elasticity of the conduit segment 170, which rebounds to a pinched geometry when unloaded. The tubing or conduit 170 may be formed from flexible polymers such as silicone, polyethylene, or polyurethane, and the self-crimping mechanism may include contoured surfaces, grooves, or other geometries to maintain a reliable seal without undue wear. These features collectively enable consistent and repeatable flow control, precise liquid metering, and reliable atomization in various orientations, including upright, inverted, or angled positions. The flow-blocking mechanism 120 may be incorporated within the reservoir assembly 104, chamber 106, or a connecting conduit to prevent leakage of the liquid 152 when the device is idle or uncoupled.

In some embodiments, when the trigger 112 is in its default position, the flow-blocking mechanism 120 applies compressive force to the conduit 170, pinching or occluding it to prevent passive leakage or unintended spraying. When the trigger 112 is actuated to its active or unlocked position, the compressive force may be mechanically released or relieved, thereby permitting liquid 152 to travel through the conduit to the atomizer 108 for atomization. In some embodiments, the flow-blocking mechanism 120 is integrated with or mechanically coupled to the sliding motion of the trigger 112, such that actuation of the trigger simultaneously enables both electrical activation of the atomizer 108 and fluidic access by releasing the crimped conduit 170.

These features collectively enable consistent and repeatable flow control, precise liquid metering, and reliable atomization in various orientations, including upright, inverted, or angled positions. The flow-blocking mechanism 120 may be incorporated within the reservoir assembly 104, cavity 156, chamber 106, or a connecting conduit to prevent leakage of the liquid 152 when the device 100 is idle or uncoupled. In some embodiments, integration of the flow-blocking mechanism 120 with a sliding trigger 112 provides a leak-prevention function by ensuring that both atomizer activation and liquid access are mechanically disabled when the trigger 112 is in its locked state.

In some embodiments, the reservoir assembly 104 also includes a rib structure 122 that improves structural integrity and resists compression from external pressure such as pressure from a user's hand gripping the device 100, contact with pockets or bags, impacts from accidental drops or bumps, sitting on the device 100, putting the device 100 in luggage, stacking or shipping forces, or compression from other objects placed on or against the device during storage or transport.

The rib structure 122 may be externally visible. The rib structure 122 may be internal to the reservoir assembly 104. In some embodiments, the rib structure 122 is integrated with branding or a logo. In some embodiments, the rib structure 122 assists in maintaining a leak-proof configuration by preventing external pressure from forcing liquid 152 through unintended flow paths such as the conduit 170, chamber 106, or valve mechanism 118.

In some embodiments, the reservoir assembly 104 is configured as a leak-proof reservoir. A leak-proof configuration may be achieved by combining one or more structural and functional features, including the flow-blocking mechanism 120 that prevents liquid 152 from escaping through the conduit 170 when the trigger 112 is not actuated, and the rib structure 122 that resists external compressive forces which could otherwise cause liquid displacement or leakage, as described herein. Together, these features provide a reservoir assembly 104 that maintains liquid integrity and prevents leakage during transport, storage, or use under normal handling conditions.

As shown in FIG. 7, and in some embodiments, the lighting component 124 is selected from a blue LED (e.g., 495 nm), a green LED (e.g., 540 nm), or an ultraviolet (UV) LED (e.g., 350 nm), configured to interact with a fluorescent agent in the liquid formulation, allowing visual confirmation of spray coverage on the surface. The lighting component 124 may remain active for a predetermined period (e.g., 10 seconds) after spraying to enhance visibility. This timing feature operates by continuing to emit light after actuation of the atomizer 108 has ceased, thereby illuminating any fluorescent material deposited on the surface by the atomized liquid particles 154. The emitted light excites the fluorescent agent, causing it to emit visible light that highlights areas that have been covered by the atomized liquid particles 154, providing the user with immediate visual feedback regarding the uniformity and extent of coverage of a target surface 182 or indicating a sanitation dwell time. As described herein, the lighting component 124 may be an LED and may be independently operable and may include a wavelength of approximately 350 nm, 495 nm, 540 nm, or other suitable excitation wavelengths, which may excite fluorescent agents included in the spray liquid 152 and/or the atomized liquid particles 154 for enhanced visual feedback. In some embodiments, the lighting component 124 is a color other than blue, including, without limitation, red, orange, yellow, white, indigo, or violet. In some embodiments, the lighting component 124 is an ultraviolet (UV) LED. In some embodiments, the predetermined 10 second illumination period corresponds to a recommended germicidal dwell time, thereby informing the user that a treated target surface 182 has reached a sanitization endpoint. The continued illumination may serve as a visual cue that the sprayed liquid 152 and/or the atomized liquid particles 154 have remained in contact with the target surface 182 long enough to inactivate microorganisms, providing assurance of safety prior to handling. In some embodiments, this dual function both enhances spray visualization and communicates to the user that sanitation has been achieved.

Figure 8:
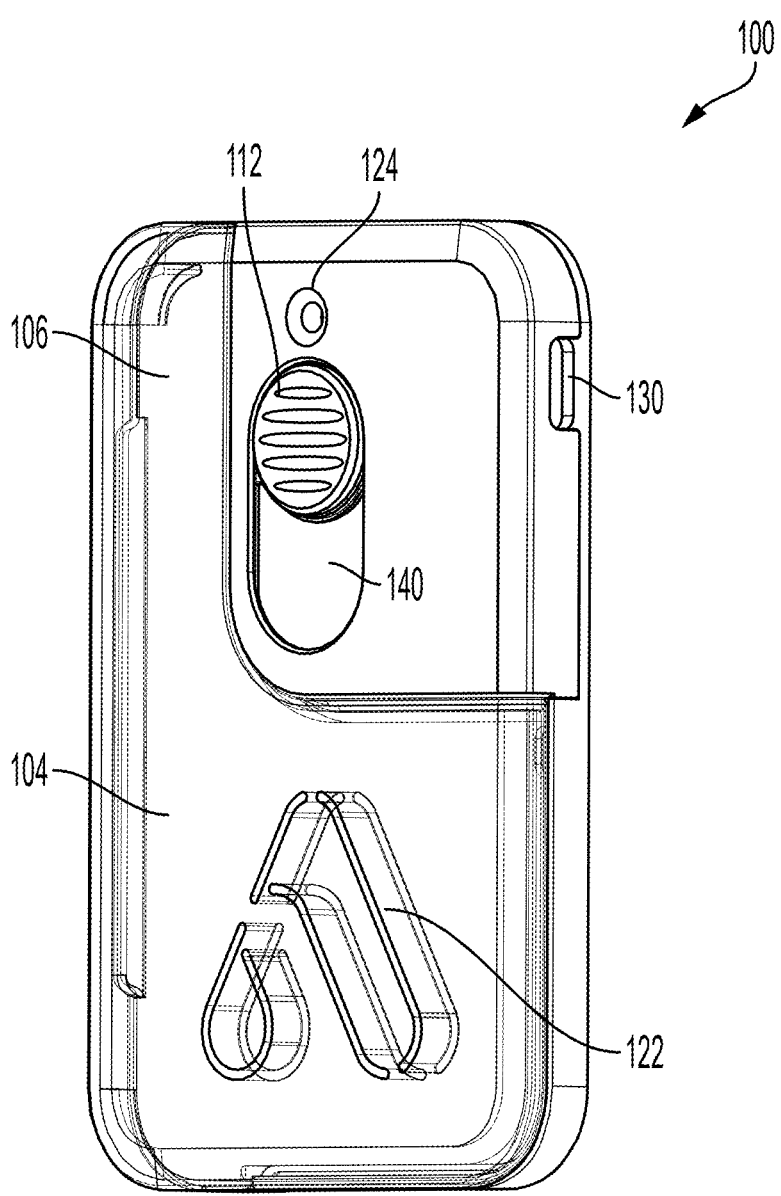
FIG. 8 is a perspective view of the spraying device 100 in an assembled configuration, showing the compact dimensions of the device 100, the ergonomic placement of the trigger 112, and the positioning of the reservoir assembly 104 relative to the frame 102 and front enclosure 150.

In some embodiments, and as shown in FIG. 8, the reservoir assembly 104 is manufactured from a polymeric material incorporating one or more transparent or translucent panels 126. These panels 126 may be positioned along a front, side, and/or rear wall of the reservoir assembly 104 to allow a user to quickly assess a liquid level without detaching the reservoir assembly from the frame 102. The exploded view of FIG. 7 also shows the spatial arrangement of internal components, including the chamber 106 located adjacent to the piezoelectric atomizer 108 to facilitate consistent liquid delivery. The front enclosure 150 may be configured to interface with the trigger track 140 to enable linear or sliding movement of the trigger 112 while maintaining alignment with the piezoelectric atomizer 108 and lighting component 124.

Figure 9:
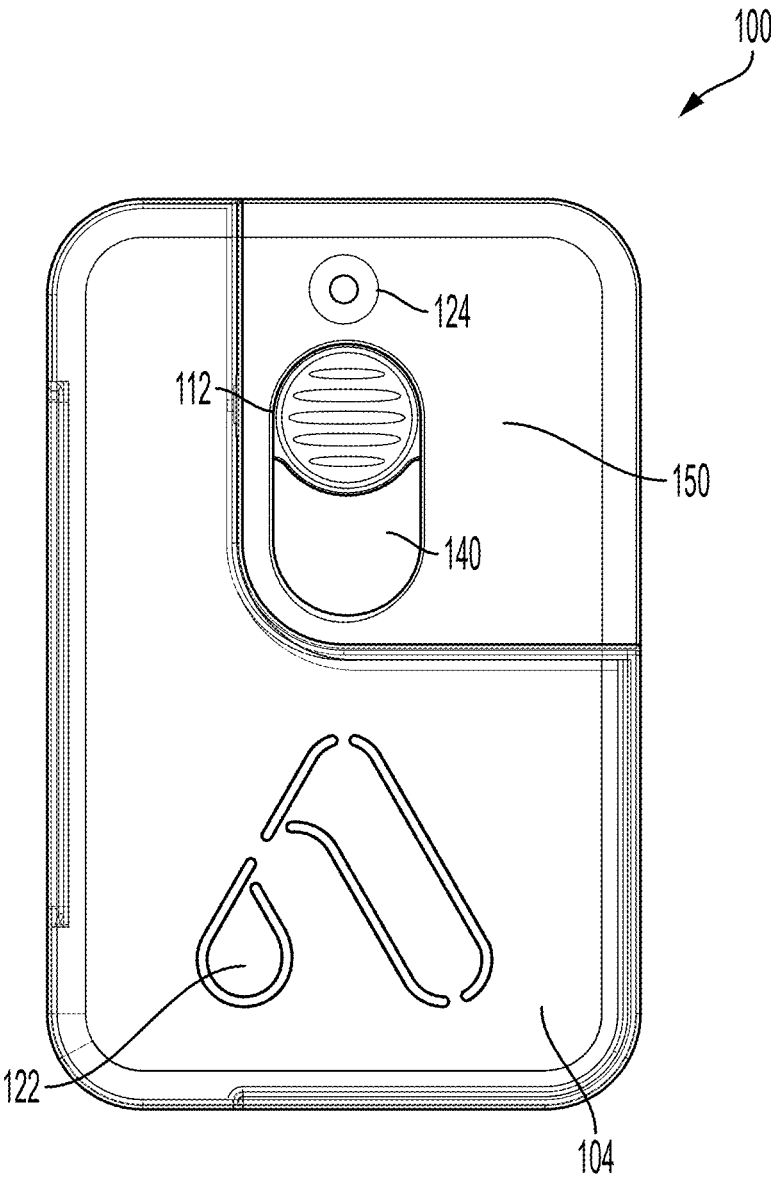
FIG. 9 is a front view of the spraying device in an assembled configuration, showing the compact dimensions of the device 100, the ergonomic placement of the trigger 112, and the positioning of the reservoir assembly 104 relative to the frame 102 and front enclosure 150.

In some embodiments, and as shown in FIGS. 8, 9, and 12, the assembled device 100 is dimensioned to fit comfortably on the rear surface of a mobile device 174, such as a smartphone, without obstructing camera 176 viewpoint or functionality. The front enclosure 150 may include a flush or contoured surface to blend with the reservoir assembly 104, thereby reducing snagging when the assembly is placed in or removed from a pocket.

Figure 10:
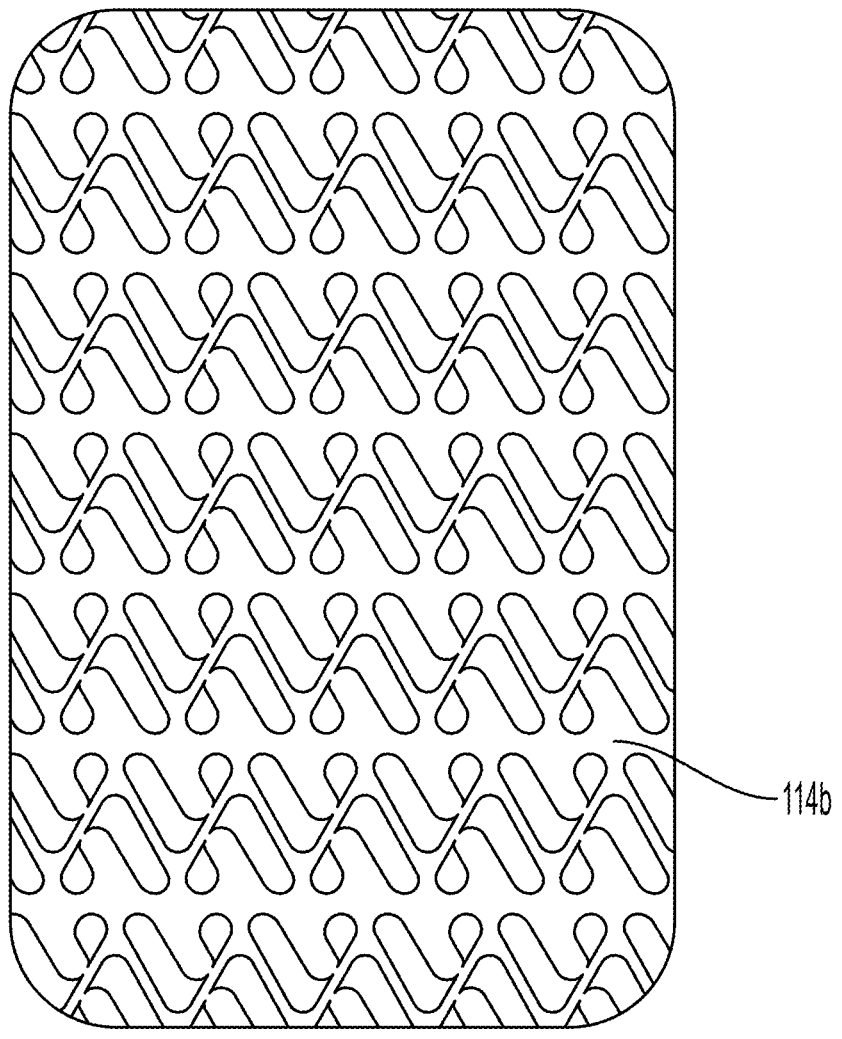
FIG. 10 is a view of the spraying device 100 highlighting the frictional surface or pad 114*b* associated with the embedded metal or magnetic ring 114*a* of the magnetic attachment unit 114 (not shown).

In some embodiments, and shown in FIG. 10, the textured frictional surface or pad 114*b* is formed as a continuous sheet over the metal or magnetic ring 114*a* of the magnetic attachment unit 114. This configuration may provide frictional engagement with the rear surface of a mobile device while allowing the magnetic elements to function without interference. In some embodiments, the frictional surface or pad 114*b* is molded directly into the rear housing of the frame 102 or affixed using an adhesive or mechanical fastener.

Figure 11:
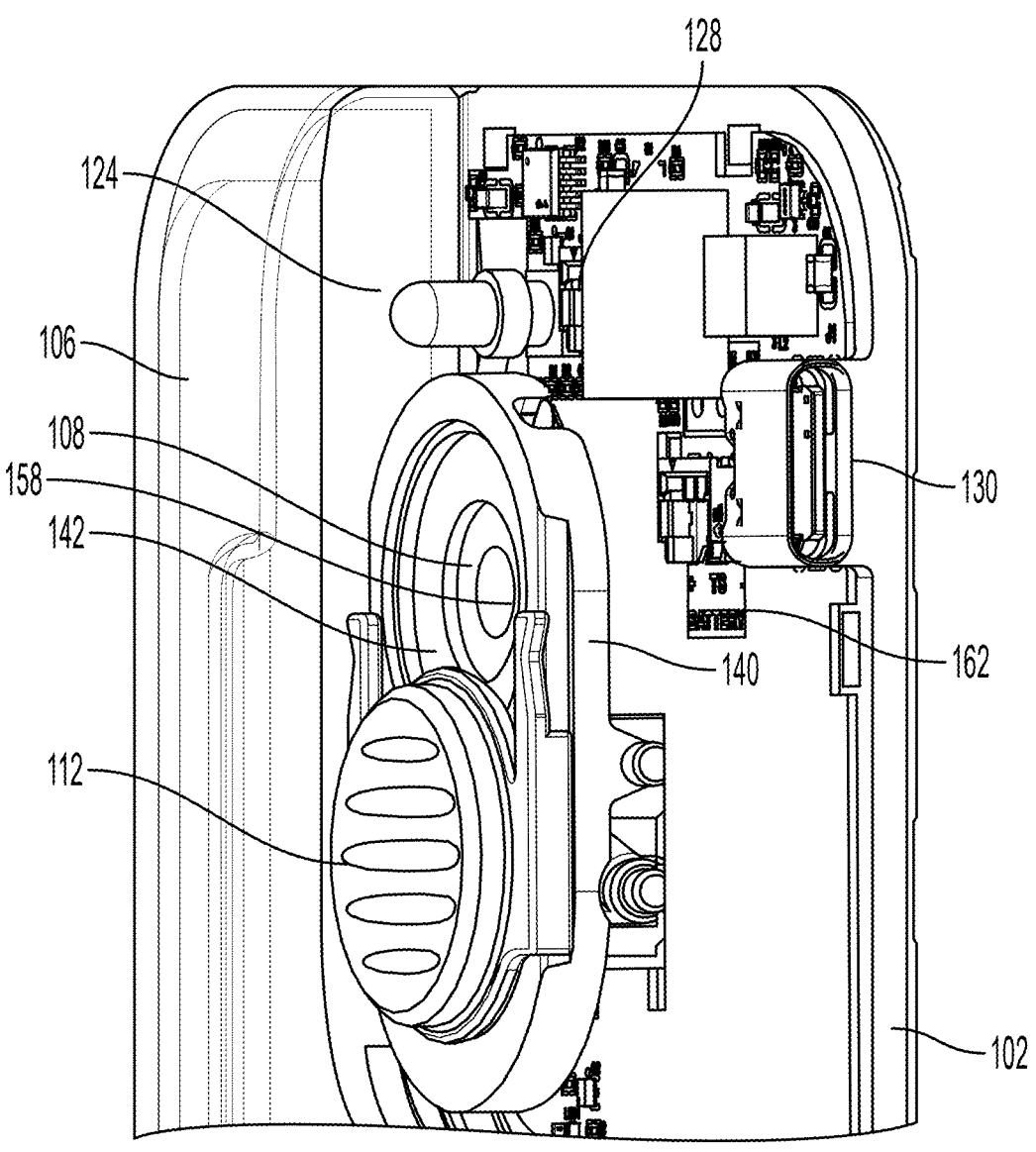
FIG. 11 is a cutaway side view of the spraying device 100 illustrating the lighting component 124 positioned at the top of the device and the USB-C connector 130 positioned at a side edge of the frame 102.

In some embodiments, and as shown in FIG. 11, the lighting component 124, such as an LED, is oriented to project light along the spray path generated by the piezoelectric atomizer 108, enabling illumination of the liquid particles and any fluorescent additives. The lighting component 124 may also serve as a status indicator for charging or operational modes. The USB-C connector 130 may be positioned along a side edge of the frame 102 to allow charging of the power source 110 without detaching the device 100 from a mobile device. In some configurations, activation of the USB-C connector 130 for charging also illuminates the reservoir assembly 104 to assist in nighttime operation or visual inspection of liquid 152 levels.

As shown in FIG. 12, in some embodiments, the spraying device 100 is magnetically attached to a mobile device 174. In some embodiments, the spraying device 100 is coupled to the rear surface 178 of a mobile device 174 via the magnetic attachment unit 114, which includes metal or magnetic ring 114*a* and frictional surface or pad 114*b*. This configuration allows the device 100 to be securely mounted to the rear surface of the mobile device 174 while also permitting easy detachment when not in use. The frictional surface or pad 114*b* may increase friction with the rear surface 178 of a mobile device 174, thereby reducing unintended slippage and enhancing stability during operation.

In some embodiments, and as further shown in FIG. 12, the spraying device 100 is dimensioned and configured such that its position on the rear surface 178 of a mobile device 174 does not obstruct the mobile device camera 176 or other functional components of the mobile device 174. The compact geometry of the spraying device 100 may allow it to mount below or laterally offset from the mobile device camera 176, preserving the field of view while enabling simultaneous use of the camera 176 and spraying functions.

In some embodiments, the spraying device 100 has an overall size of approximately 2.5 inches by 4 inches with a thickness of approximately 0.33 inches. In some embodiments, the length of the spraying device 100 is between about 2.0 and about 3.0 inches, the width is between about 3.5 and about 4.5 inches, and the thickness is between about 0.25 and about 0.50 inches. In some embodiments, the thickness is less than 0.50 inches, less than 0.45 inches, or less than 0.40 inches. In further embodiments, the device 100 has a thickness of about 0.28, about 0.30, about 0.33, about 0.35, about 0.38, or about 0.40 inches. In still further embodiments, the length of the device 100 is 2.0-3.0 inches, the width is 3.5-4.5 inches, and the thickness is 0.25-0.50 inches. Such dimensions may allow the spraying device 100 to mount securely to the rear surface 178 of a mobile device 174 without significantly increasing the bulk of the mobile device or interfering with the mobile device camera 176 or other functional components.

Figure 13B:
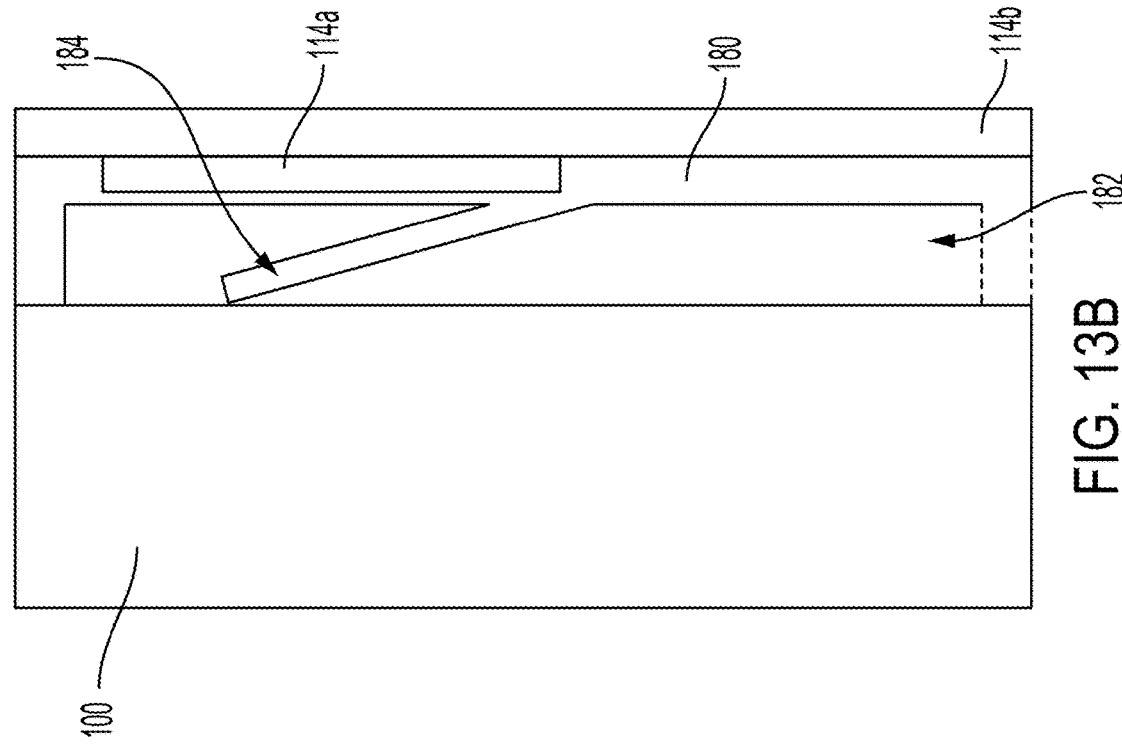
FIGS. 13A-13B are side views of the spraying device 100.
Figure 13A:
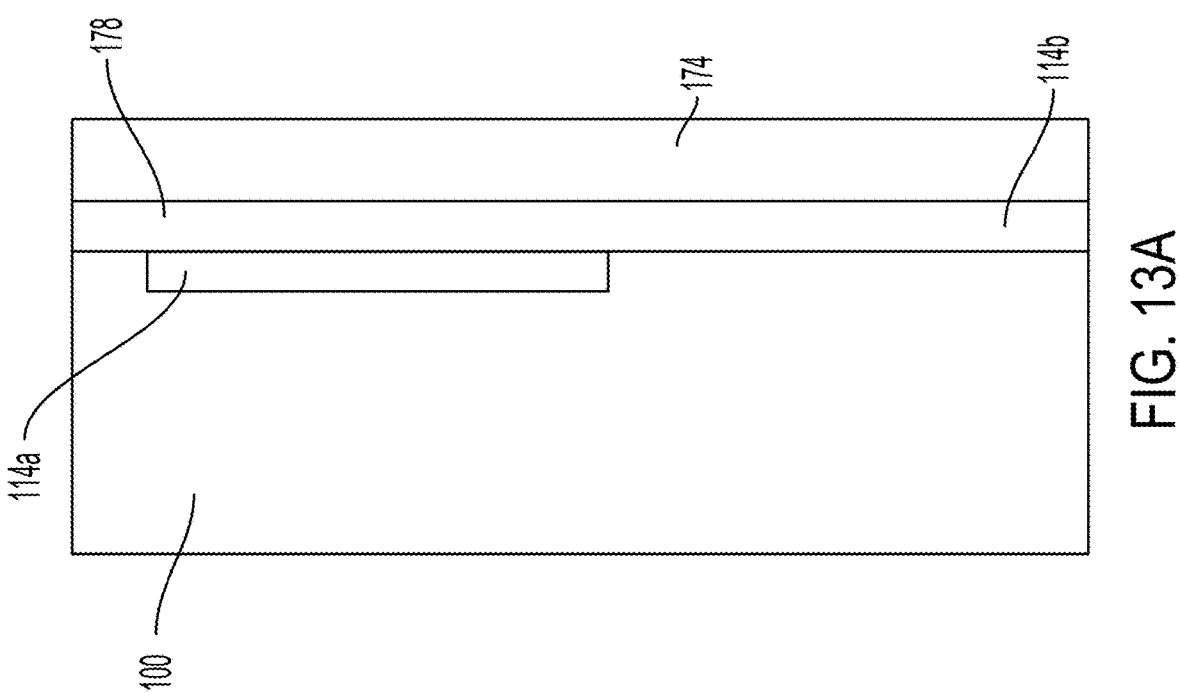

In some embodiments, and as shown in FIG. 13A, the spraying device 100 may be magnetically coupled to the mobile device 174 such that the exterior surface of the device 100 is substantially flush with the surface 178 of the mobile device 174. This configuration provides a slim, low-profile attachment that minimizes bulk and preserves ergonomic handling of the mobile device 174 during everyday use.

In some embodiments, and as shown in FIG. 13B, the spraying device 100 further includes an optional wallet assembly 180 positioned on a rear portion of the device 100 between the frame 102 and the magnetic attachment unit 114 (including, as shown, embedded metal or magnetic ring 114*a* and frictional surface or pad 114*b*). The wallet assembly 180 may comprise a card slot 182 configured to receive and retain one or more personal items such as credit cards, identification cards, folded currency, and/or cash bills. The card slot 182 may be formed within a discrete polymeric section mounted adjacent to the frame 102 and inward of the magnetic attachment unit 114, thereby integrating storage capacity without materially increasing the thickness of the device 100.

Figure 14:
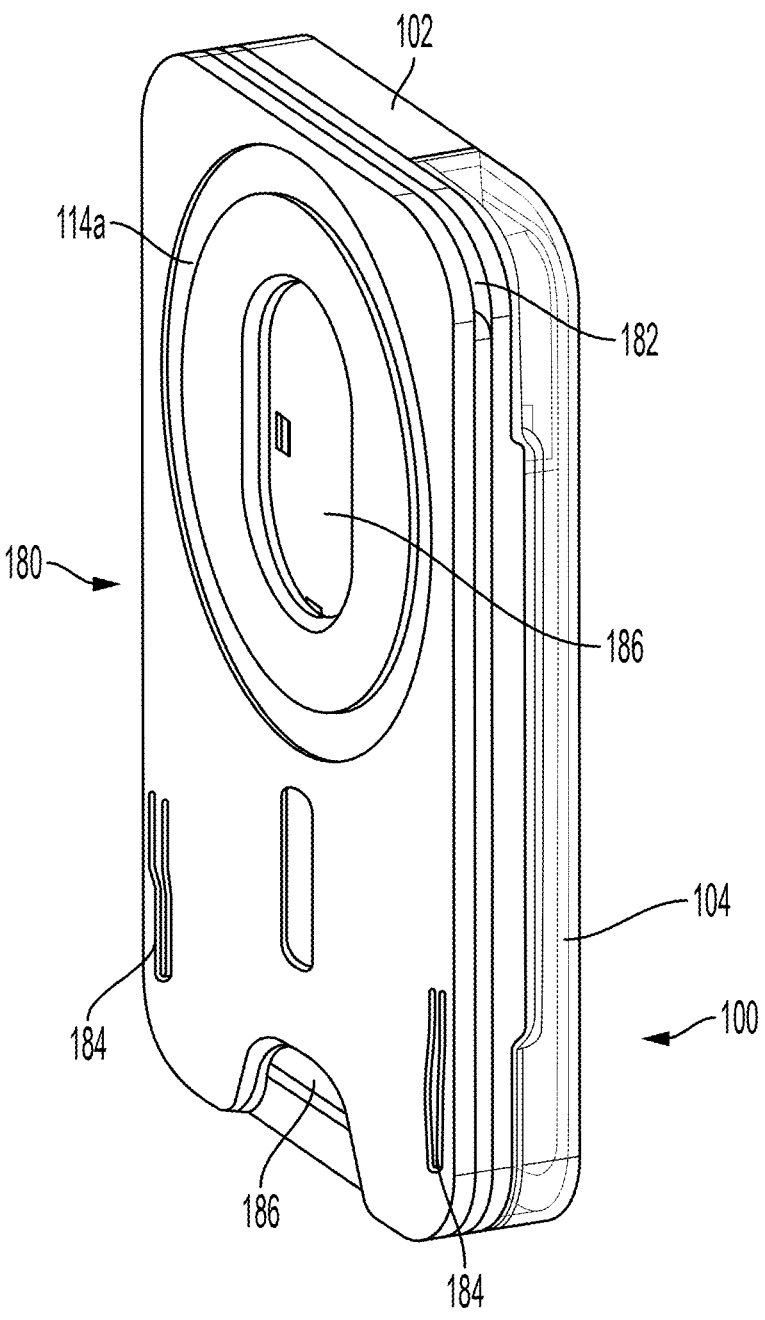
FIG. 14 is a perspective view of the spraying device 100 including a wallet assembly 180 attached to the frame 102 and showing the reservoir assembly 104, the wallet assembly 180 comprising a card slot 182, one or more retainers 184, and through holes 186 for extracting cards in conjunction with the magnetic attachment unit 114*a*.
Figure 15:
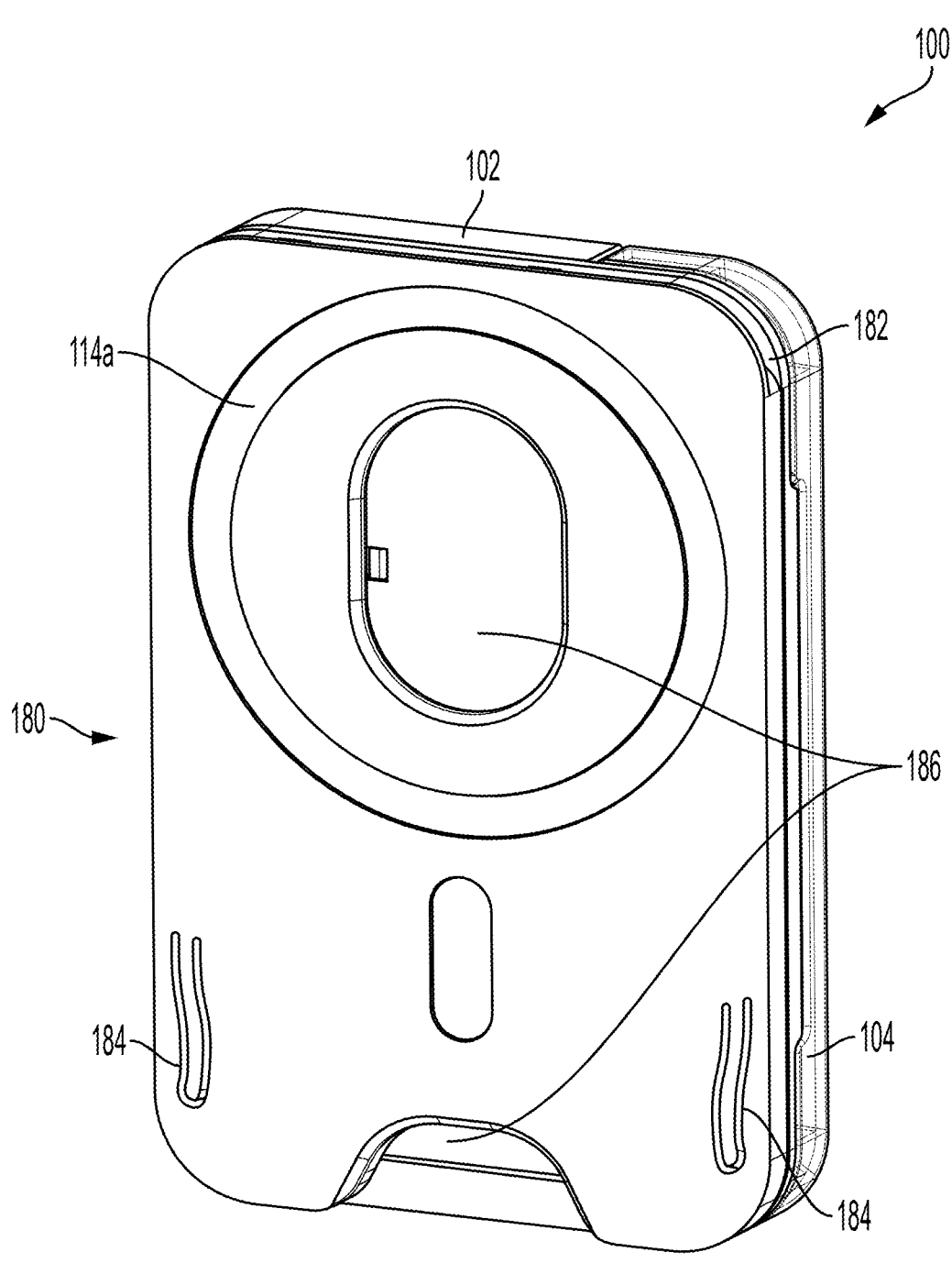
FIG. 15 is a perspective view of the spraying device 100 including a wallet assembly 180 attached to the frame 102, the wallet assembly 180 comprising a card slot 182, one or more retainers 184, and one or more through holes 186.

As shown in FIGS. 13B, 14 and 15, and in some embodiments, the wallet assembly 180 includes one or more retainers 184 configured to hold cards and/or bills securely within the card slot 182. The retainers 184 may be configured to apply a biasing force against a card to prevent unintended movement or ejection. In certain embodiments, the retainer 184 comprises a spring-loaded element that flexes upon card insertion and applies a restoring force when the card is fully seated. In other embodiments, the retainer 184 comprises one or more relief cuts formed in a polymeric wall of the wallet assembly 180, such that resilient tabs are created which deflect inward upon card insertion and return outward to grip the card edges. In further embodiments, the retainer 184 is formed from an elastomeric or rubber-like material integrated into the card slot 182 to provide frictional retention. In yet further embodiments, the retainer 184 comprises an integral molded feature of the wallet assembly 180, such as a polymer ridge or detent, dimensioned to mechanically engage a recess or edge of the card or bills. These embodiments may be used individually or in combination to provide secure card retention and prevent accidental ejection of the card or bills from the wallet assembly 180.

The wallet assembly 180 may further include one or more through holes 186 extending through the rear surface of the assembly. The through holes 186 are aligned with the card slot 182 to allow a user to push against a card for extraction. In some embodiments, the through holes 186 are dimensioned to permit fingertip access to the card, while in other embodiments, the through holes 186 are elongated slots or circular apertures sized to accommodate both fingertip and tool-assisted removal. Together, the card slot 182, retainers 184, and through holes 186 allow secure card storage while permitting quick and reliable access when needed.

Figure 16:
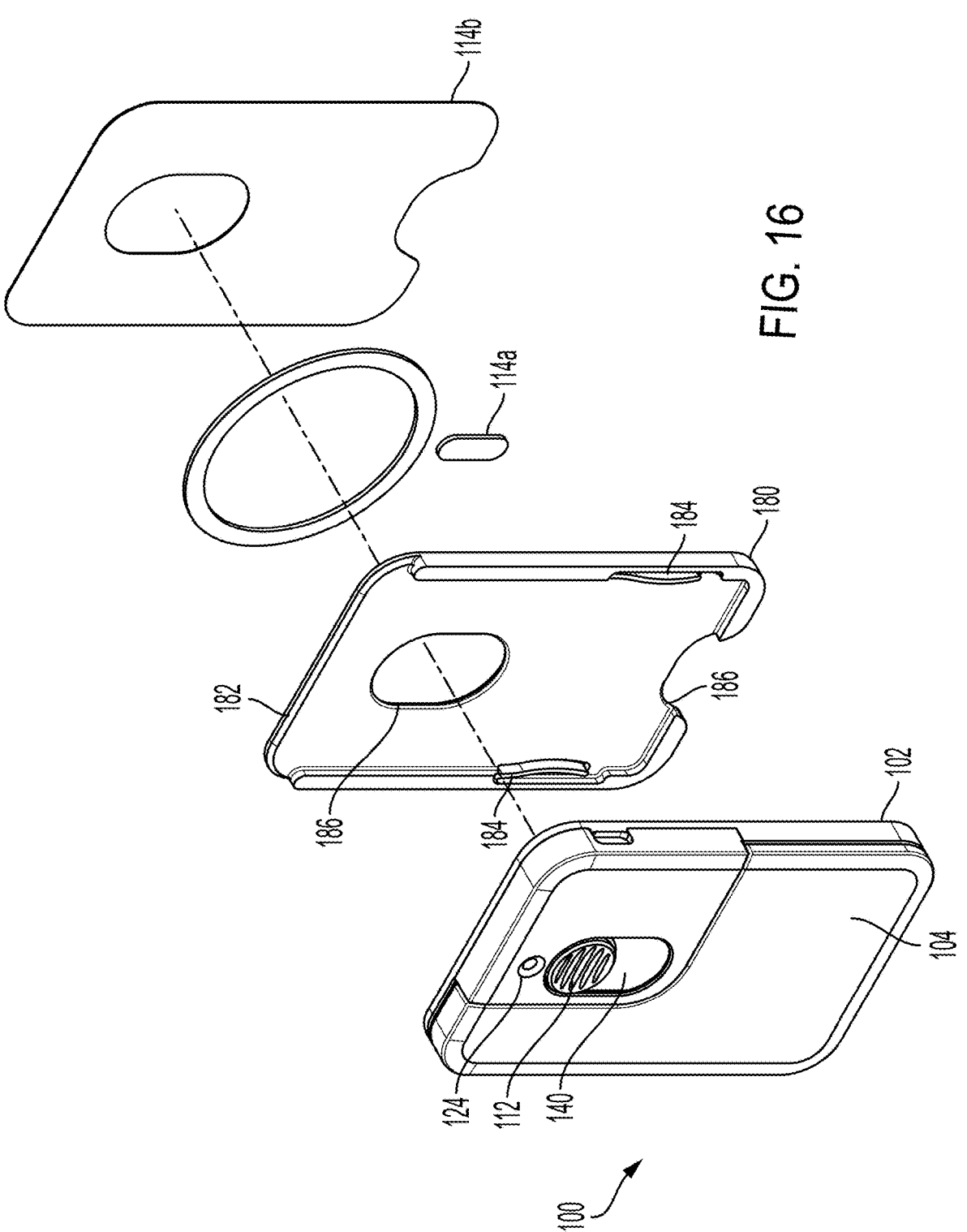
FIG. 16 is an exploded perspective view of the spraying device 100 and wallet assembly 180, illustrating the frame 102, reservoir assembly 104, trigger 112, lighting component 124, embedded metal or magnetic ring 114*a*, frictional surface or pad 114*b*, card slot 182, retainer 184, and one or more through holes 186.

As shown in FIG. 16, the wallet assembly 180 is configured to align with and attach to the frame 102 of the spraying device 100. The spraying device 100 includes the reservoir assembly 104, trigger 112, and lighting component 124, while the wallet assembly 180 includes an embedded metal or magnetic ring 114*a* and frictional surface or pad 114*b* for attachment to a mobile device 174. The wallet assembly 180 further defines a card slot 182 for receiving a card or other flat article, one or more retainers 184 for holding the card in place, and one or more through holes 186 configured to assist in removal of the card. As shown, the modular nature of the wallet assembly 180 allows for the attachment or detachment from the spraying device 100 as desired while maintaining access to the reservoir assembly 104 and preserving functionality of the spraying device 100.

Figures 17A, 17B:
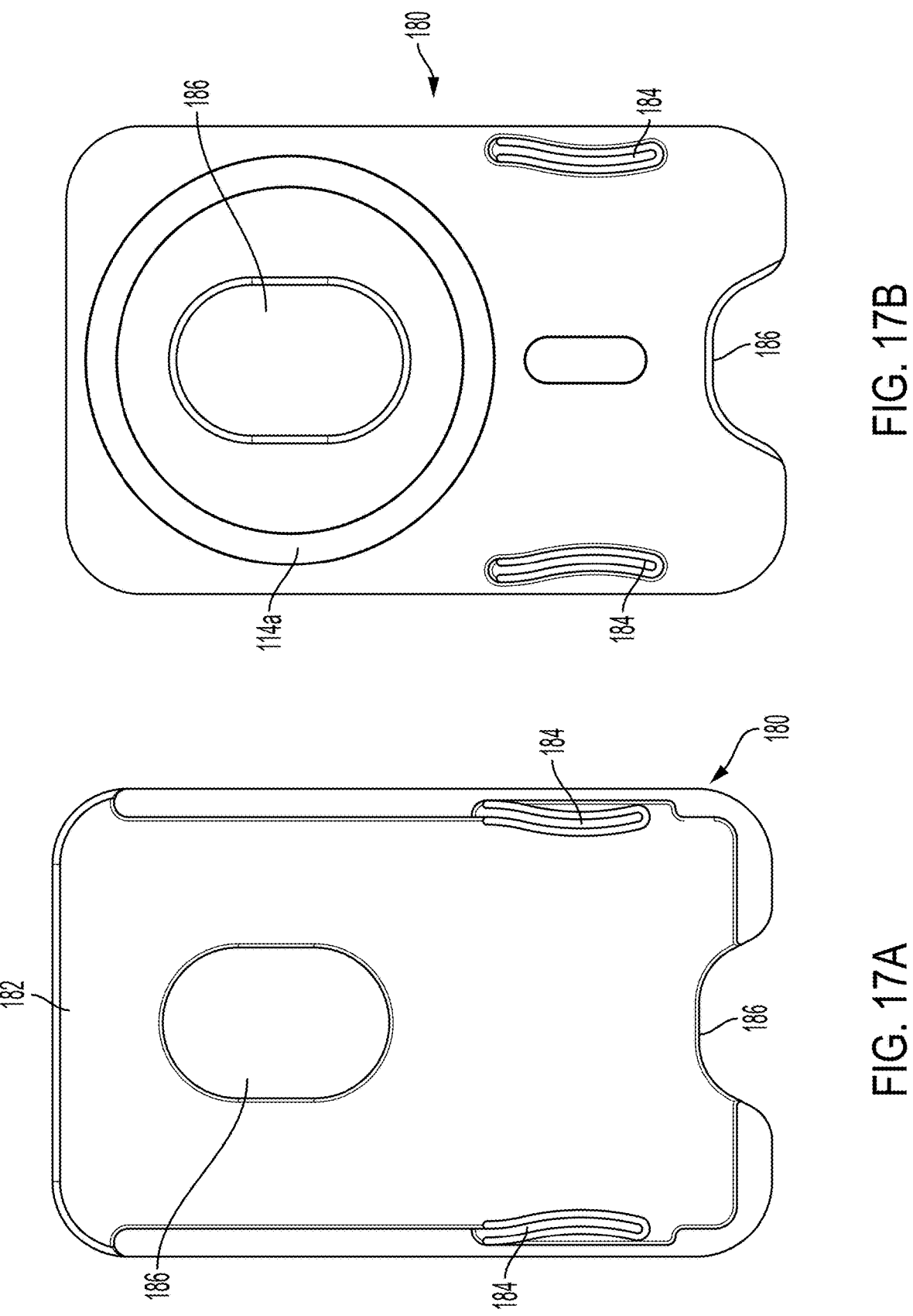
FIGS. 17A-17B are front and rear views of the wallet assembly 180.

FIG. 17A shows a front view of the wallet assembly 180. In this view, the card slot 182 is visible and is configured to allow insertion of one or more cards, such as a credit card, identification card, or folded currency. The slot 182 may be dimensioned to accommodate standard card sizes. Within the card slot 182, one or more retainers 184 are shown, which are biased to retain the card securely in place and prevent accidental loss during movement or handling of the wallet assembly 180. The one or more through holes 186 may be sized and positioned to allow a user to push a card outward from the card slot 182 to facilitate easy removal.

FIG. 17B shows a rear view of the wallet assembly 180. From this perspective, the card slot 182, one or more retainers 184, and one or more through holes 186 are shown, and the rear surface of the wallet assembly 180 additionally shows the embedded metal or magnetic ring 114*a* that enables magnetic attachment of the wallet assembly 180 and the spraying device 100 to a mobile device 174. In some embodiments, the embedded metal or magnetic ring 114*a* cooperates with the frictional surface or pad 114*b* (not shown) to provide both magnetic force and frictional resistance, thereby ensuring that the wallet assembly 180 and spraying device 100 remain stably attached during use.

Figure 18:
FIG. 18 is a flowchart illustrating a method of spraying a liquid 152 using the device 100 according to some aspects.
Figure 18:
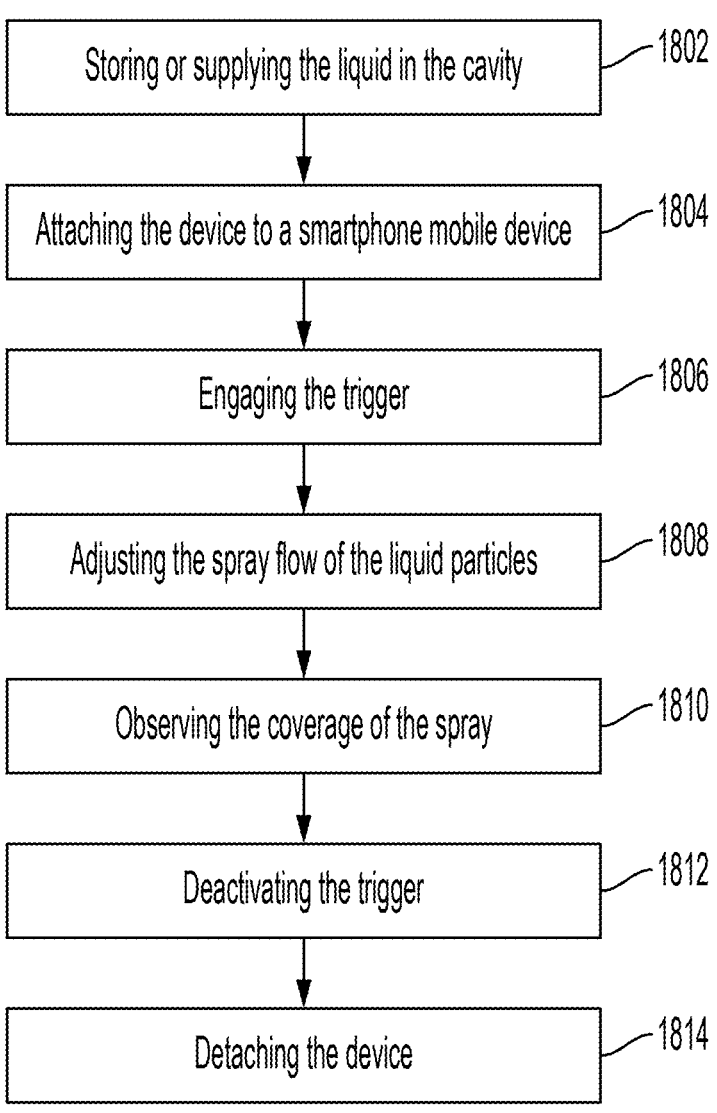

Referring now to FIG. 18, a method 1800 of spraying by utilizing the spraying device described herein is provided. The method 1800 is described from the perspective of a user operating the device 100 and expressly identifies the roles of the reservoir assembly 104 (including cavity 156 and, in some embodiments, chamber 106 and divider 144), the piezoelectric atomizer 108 (including mesh 136, and nozzle structure 158), the trigger 112 and trigger track 140, the flow-blocking mechanism 120 (including conduit 170 and clamp 172), the valve mechanism 118, the wick 116, the lighting component(s) 124, the control board 128, the power source 110 (e.g., rechargeable battery 162, which may operably be included or housed within the frame 102 or integrated into an electronics module 164), the USB-C connector 130, the magnetic attachment unit 114 (including metal or magnetic ring 114*a* and frictional surface or pad 114*b*), the front enclosure 150, the gasket 142, and the rib structure 122. It is understood that the method 1800 may be operated with or without the presence of the wallet assembly 180. In embodiments including the wallet assembly 180, the method may further include storing one or more cards within the card slot 182, securing the cards in place using the one or more retainers 184, and optionally removing the cards through the one or more through holes 186. These steps may be performed before, during, or after use of the spraying device 100, and do not interfere with the spraying operations described herein.

In a first Step 1802, the user stores the desired liquid 152 (including, for example, antibacterial, antiseptic, perfume, fragrance, breath spray, deodorant, cleaning agent, beauty formulation, insect repellent, personal protection spray, sunscreen, or medication) in the cavity 156 of the reservoir assembly 104. This can be done by detaching the reservoir assembly 104 from the frame 102 and filling or refilling the cavity 156 of the reservoir assembly 104, then reattaching it, or adding or replacing the reservoir assembly 104 with a reservoir assembly 104 that has a pre-filled cavity 156. The user supplies a liquid 152 to the reservoir assembly 104 via a fill port 138 and reseals it using the cap 146. The translucent panel(s) 126 enable visual confirmation of the liquid level 152 in the cavity 156 during and after filling. The gasket 142 provides a sealed interface to reduce leakage into adjacent components. The rib structure 122 resists compressive deformation of the reservoir assembly 104 when squeezed in the hand or while the device 100 is in a pocket or bag.

In step 1804, the user attaches the device 100 to a mobile device 174. As described herein, the attachment can occur by a process wherein the metal or magnetic ring 114a of the device 100 aligns with a complementary magnetic array 186 of the mobile device 174, and including the frictional surface or pad 114b increases friction against the rear surface 178 of the mobile device 174 to resist slippage. The device 100 is dimensioned so as not to obstruct the rear-facing camera 176 when attached. In certain embodiments, the overall device thickness is about 5 to about 15 mm, e.g., about 6 to about 14 mm, about 7 to about 13 mm, or about 8 to about 12 mm, to maintain a slim profile suitable for attachment to a mobile device 174. In some embodiments, the device thickness may be approximately 5, 6, 7, 8, 9, 10, 11, 12, 13, 14, or 15 mm. In some embodiments, the device thickness may be within a range selected from 5 to 6 mm, 5 to 8 mm, 6 to 10 mm, 8 to 12 mm, 10 to 14 mm, 12 to 15 mm, or 10 to 15 mm. In embodiments including the wallet assembly 180, the overall thickness of the spraying device 100, including the wallet assembly 180, may be increased by about 5 to about 10 mm, for example, about 6, about 7, about 8, about 9, or about 10 mm of additional thickness, depending on the size and number of cards stored within the card slot 182. In some embodiments, the combined thickness of the spraying device 100 with the wallet assembly 180 is between about 10 and about 25 mm. In other embodiments, the combined thickness is between about 12 and about 20 mm, for example, about 13, about 14, about 15, about 16, about 17, about 18, or about 19 mm. In further embodiments, the additional thickness contributed by the wallet assembly 180 is 5, 6, 7, 8, 9, or 10 mm, and the total combined thickness of the spraying device 100 with the wallet assembly 180 is 10, 11, 12, 13, 14, 15, 16, 17, 18, 19, 20, 21, 22, 23, 24, or 25 mm. The attachment is secure yet easily detachable, permitting the user to reposition or remove the device 100 without tools.

In Step 1806, the user engages the trigger 112. The user moves the trigger 112 from a disengaged or "locked" position to an engaged or "ready" position along the trigger track 140, then actuates the trigger 112 to energize the atomizer 108. When actuated, the control board 128 supplies power from the power source 110 (e.g., rechargeable battery 162) to the piezoelectric atomizer 108. Liquid 152 is presented to the atomizer 108 either (i) from the chamber 106 positioned adjacent to the atomizer 108 with flow into the chamber 106 regulated by the valve mechanism 118, or (ii) via the wick 116 drawing liquid 152 from the cavity 156 of the reservoir assembly 104 toward the atomizer 108. The atomizer 108 ejects atomized liquid particles 154 through the nozzle structure 158 of the front enclosure 150. In some embodiments, the term "self-crimping" as applied to the flow-blocking mechanism 120 may denote that, in the default state (trigger 112 not actuated) the conduit segment 170 is oppressed via a compressive pinch, for example via clamp 172, sufficient to occlude or substantially occlude flow; upon actuation to the "ready" state, a linked motion (such as, for example, an actuation of the trigger 112) releases or reduces the compressive force to permit controlled liquid transfer toward the atomizer 108. In some embodiments, the self-crimping action is purely mechanical (spring-biased clamp 172); in other embodiments, it exploits the inherent elasticity of a molded conduit segment 170 that rebounds to a pinched geometry when unloaded. These features collectively enable reliable spraying in upright or inverted orientations by managing head pressure and local liquid availability at the atomizer 108.

In Step 1808, the user may adjust the spray flow of the liquid particles. The user may adjust spray characteristics manually and/or electronically. Manually, the user modulates trigger 112 actuation (e.g., short press for a brief burst; sustained press for continuous spray). Electronically, the control board 128 varies the piezoelectric atomizer 108 drive (e.g., duty cycle, voltage, and/or frequency) to change output flow and target droplet size; in some embodiments, presets are selectable on the device 100 or via a mobile application 200 communicating over BLE. In certain embodiments, a child-proof mode of the mobile application 200 requires a specific trigger sequence before enabling spray. In some embodiments, the maximum continuous spray time is limited by firmware to a defined interval (e.g., 1 second, 5 seconds, 10 seconds, 15 seconds, 20 seconds, or 30 seconds) to conserve liquid 152 and power and to reduce over-application of atomized liquid particles 154. The spray flow rate may be further adjusted based on a distance between the device 100 and a target surface 182, determined using a mobile device camera 176.

In Step 1810, the user observes the coverage of the spray. During spraying, the lighting component 124 (e.g., an LED) illuminates the atomized liquid particles 154 and the target surface 182. In some embodiments, the lighting component 124 includes a wavelength of approximately 495 nm to excite fluorescent agents premixed in the liquid 152, thereby enhancing visual feedback of coverage on the target surface 182. The control board 128 implements a hold-on timer such that, when the user releases the trigger 112, the lighting component 124 remains illuminated for a predetermined period to allow inspection of coverage. In some embodiments, the hold-on duration may be about 5 to about 15 seconds, e.g., about 5 to about 10 seconds, about 8 to about 12 seconds, or about 10 to about 15 seconds. In some embodiments, the hold-on duration may be approximately 5, 6, 7, 8, 9, 10, 11, 12, 13, 14, or 15 seconds. In some embodiments, the hold-on duration may be within a range selected from 1 to 5 seconds, 5 to 10 seconds, 10 to 15 seconds, 15 to 20 seconds, 20 to 25 seconds, or 20 to 30 seconds. In some embodiments, the hold-on duration may be user-selectable or programmable via software using the mobile application 200, allowing the user to customize the LED illumination period according to personal preference, the type of liquid being sprayed, or the desired dwell time on a target surface. The lighting component 124 can also act as a status indicator (e.g., distinct blink patterns or intensities for low battery, charging, or lock state). In some embodiments, the user uses a mobile application 200 in coordination with the spraying device 100 to observe the coverage of the spray. For example, the user may use a mobile application 200 to receive images from the camera 176 of the mobile device 174 and estimate the device 100-to-target surface 182 distance. In such an embodiment, the control board 128 adjusts atomizer 108 drive accordingly to maintain a consistent deposition rate. In some embodiments, orientation data and/or proximity data from the camera 176 are provided to the control board 128 to optimize drive conditions when the device 100 is tilted or inverted. The mobile application 200 analyzes fluorescence intensity and spatial distribution of the atomized liquid particles 154 in feed from the camera 176 of the mobile device 174 to estimate coverage uniformity and alerts the user if additional passes are recommended. The application 200 can log application time, estimated volume dispensed, and device 100 status; firmware updates to the control board 128 are, in some embodiments, delivered over BLE.

In Step 1812, the user deactivates the trigger. The user releases the trigger 112, whereupon the control board 128 de-energizes the atomizer 108 and returns the device 100 to the locked state. The flow-blocking mechanism 120 re-applies compressive force via clamp 172 and/or the elastic conduit 170 to prevent passive leakage. In embodiments including a valve mechanism 118, reverse flow from the chamber 106 toward the cavity 156 and/or unintended seepage toward the atomizer 108 is further reduced. The mesh 136 at the nozzle structure 158 also impedes droplet coalescence and limits dribble after shutoff. After the lighting component 124 completes the hold-on interval, it turns off automatically unless otherwise commanded, for example, by the control board 128.

In Step 1814, the user detaches the device. The user detaches the device 100 from the mobile device 174 by overcoming the magnetic coupling of the metal or magnetic ring 114a to the array 186; the frictional surface or pad 114b assists by providing controlled friction and preventing sudden slips during removal. The user charges the power source 110 via the USB-C connector 130; in some embodiments, activation of the USB-C connector 130 for charging causes an illumination of the lighting component 124 within or adjacent to the reservoir assembly 104, aiding nighttime filling or inspection. The user can also reseal the fill port 138 with the cap 146.

The sequence of steps 1802-1814 is repeatable as needed. At each cycle, the structural features (e.g., rib structure 122, front enclosure 150) and sealing features (e.g., gasket 142, cap 146) contribute to durability and leak mitigation, while the magnetic attachment unit 114 and compact dimensions maintain compatibility with typical mobile device use, including unobstructed camera 176 operation and camera field of view.

Aspects of the present invention have been fully described above with reference to the figures. Although the invention has been described based upon these preferred aspects, it would be apparent to those of skill in the art that certain modifications, variations, and alternative constructions could be made to the described aspects within the spirit and scope of the invention.

What is claimed is:

1. A spraying device comprising:
   a. a frame,
   b. a reservoir assembly, wherein the reservoir assembly is coupled to the frame and comprises a cavity configured to store a liquid;
   c. a piezoelectric atomizer configured to spray atomized liquid particles, wherein the atomized liquid particles are derived from the stored liquid;
   d. a power source, wherein the power source is configured to power the piezoelectric atomizer;
   e. a trigger, wherein the trigger is configured to activate the piezoelectric atomizer;
   f. a magnet, wherein the magnet is configured to magnetically couple the device to a mobile device;
   g. a conduit, wherein the conduit is configured to allow a flow of liquid to the piezoelectric atomizer; and
   h. a flow-blocking mechanism comprising a pinch-valve or clamp, coupled to the conduit, wherein the flow-blocking mechanism is configured to occlude the flow of liquid to the piezoelectric atomizer when the trigger is not activating the piezoelectric atomizer; or wherein the conduit is self-crimping and configured to occlude the flow of liquid to the piezoelectric atomizer when the trigger is not activating the piezoelectric atomizer.

2. The device of claim 1, further comprising a chamber contained within or coupled to the cavity, wherein the chamber is configured to store a portion of the liquid from the cavity, and wherein the stored portion of the liquid is stored substantially adjacent to the piezoelectric atomizer.

3. The device of claim 1, wherein the liquid is delivered from the reservoir assembly to a vicinity of the piezoelectric atomizer via a wick.

4. The device of claim 2, further comprising a valve mechanism configured to regulate a flow of the liquid from the reservoir assembly and into the chamber based on orientation of the device.

5. The device of claim 4, wherein the valve mechanism further comprises a one-way valve.

6. The device of claim 1, wherein the flow-blocking mechanism is mechanically coupled to the trigger such that actuation of the trigger simultaneously enables activation of the piezoelectric atomizer and fluidic access by releasing the flow-blocking mechanism.

7. The device of claim 1, further comprising a rib structure integrated with the reservoir assembly, the cavity, or the frame, wherein the rib structure is configured to resist compression and maintain structural integrity of the reservoir assembly when subjected to external pressure.

8. The device of claim 1, wherein the flow-blocking mechanism prevents liquid from leaking from the reservoir assembly.

9. The device of claim 1, wherein the atomized liquid particles are between 5 and 50 microns in size.

10. The device of claim 1, wherein the liquid comprises a sanitizing agent, a fragrance, a breath spray, a deodorant, a cleaning spray, a beauty liquid, an insect repellent, a personal protection spray, a sunscreen, or a medication.

11. The device of claim 1, further comprising an LED configured to illuminate atomized liquid particles during spraying and remain illuminated for a predetermined period of time after spraying.

12. The device of claim 11, wherein the LED is a 495 nm blue LED and the liquid comprises a fluorescent agent configured to fluoresce under said LED to visually indicate spray coverage on a target surface.

13. The device of claim 11, wherein the predetermined period of time is 10 seconds.

14. The device of claim 1, wherein the trigger comprises a sliding button configured to engage the frame and activate the piezoelectric atomizer.

15. The device of claim 14, wherein the trigger comprises a sliding switch configured to prevent unintended activation of the piezoelectric atomizer.

16. The device of claim 1, wherein the magnet comprises a metal or magnetic ring or strip.

17. The device of claim 16, wherein the magnetic ring or strip is configured to couple to a corresponding magnet of the mobile device.

18. The device of claim 16, further comprising a frictional surface or pad configured to enhance grip and prevent slippage of the device when magnetically coupled to the mobile device.

19. The device of claim 1, further comprising a USB-C connector configured to charge the power source.

20. The device of claim 19, wherein the USB-C connector is further configured to illuminate the reservoir assembly during charging.

21. The device of claim 1, wherein the cavity has a capacity of 1 to 25 milliliters.

22. The device of claim 1, further comprising a control broad disposed within the frame, wherein the control board comprises a Bluetooth Low Energy (BLE) transceiver, and a mobile device application communicatively coupled to the control board via Bluetooth Low Energy (BLE), the mobile device application configured to adjust a flow rate of the piezoelectric atomizer.

23. The device of claim 22, wherein the flow rate is adjusted based on a distance between the device and a target surface, wherein the distance is determined using a camera of the mobile device.

24. The device of claim 22, wherein the application is further configured to monitor spray coverage using a camera of the mobile device.

25. The device of claim 1, wherein the reservoir assembly is configured to be detachable from the frame.

26. The device of claim 1, wherein the reservoir assembly comprises one or more transparent or translucent panels configured to permit visual inspection of a liquid level.

27. The device of claim 1, wherein the device is sized to occupy a space below a rear-facing camera of the mobile device when the device is magnetically coupled thereto.

28. The device of claim 1, further comprising a wallet assembly coupled to the frame.

29. The device of claim 28, wherein the wallet assembly further comprises a card slot sized to receive a card, cash bills, or combination thereof.

30. The device of claim 29, wherein the wallet assembly further comprises one or more retainers configured to hold the card, cash bills, or combination thereof within the slot and one or more through holes configured to facilitate removal of said card, cash bills, or combination thereof.

\* \* \* \* \*